United States Patent
Slupik et al.

(10) Patent No.: US 11,782,403 B2
(45) Date of Patent: *Oct. 10, 2023

(54) SPACE-DRIVEN BUILDING AUTOMATION AND CONTROL, INCLUDING THE CONFIGURING OF ONE OR MORE NETWORK NODES TO AN ADDRESS THAT IS REPRESENTATIVE OF A SPACE

(71) Applicant: Silvair Sp. z o.o., Cracow (PL)

(72) Inventors: Szymon Slupik, Cracow (PL); Adam Gembala, Cracow (PL)

(73) Assignee: Silvair Sp. z o.o., Cracow (PL)

( * ) Notice: Subject to any disclaimer, the term of this patent is extended or adjusted under 35 U.S.C. 154(b) by 485 days.

This patent is subject to a terminal disclaimer.

(21) Appl. No.: 17/070,220

(22) Filed: Oct. 14, 2020

(65) Prior Publication Data

US 2021/0026315 A1 Jan. 28, 2021

Related U.S. Application Data

(63) Continuation of application No. 16/711,696, filed on Dec. 12, 2019, now Pat. No. 10,859,988, which is a
(Continued)

(51) Int. Cl.
*G05B 15/02* (2006.01)
*H04W 4/38* (2018.01)
(Continued)

(52) U.S. Cl.
CPC .............. *G05B 15/02* (2013.01); *H04W 4/33* (2018.02); *H04W 4/38* (2018.02);
(Continued)

(58) Field of Classification Search
CPC . G05B 15/02; G05B 2219/2642; H04W 4/38; H04W 4/33; H04L 67/12; H04L 67/125
See application file for complete search history.

(56) References Cited

U.S. PATENT DOCUMENTS

| | | |
|---|---|---|
| 4,918,690 A | 4/1990 | Markkula, Jr. et al. |
| 4,969,147 A | 11/1990 | Markkula, Jr. et al. |

(Continued)

FOREIGN PATENT DOCUMENTS

WO 2018024528 A1 2/2018

OTHER PUBLICATIONS

Related U.S. Appl. No. 15/479,093, Notice of Allowance, dated Mar. 21, 2019.
(Continued)

*Primary Examiner* — Chris Parry
*Assistant Examiner* — Hassan A Khan
(74) *Attorney, Agent, or Firm* — McGeary Cukor LLC; Kenneth Ottesen; Jason Paul DeMont

(57) ABSTRACT

A system and method involving actor nodes within a building that is being controlled, to be subscribed to a set of addresses, including one or more addresses that are representative of one or more respective spaces within the building being controlled. Such addresses are referred to as "space addresses." Each of the actor nodes acts upon received data packets only if a space address is received along with the data packets and the actor node has been subscribed to the space address. Concurrently, one or more sensor nodes in the system are configurable to transmit the one or more space addresses and the data packets. A user device in the system receives commands from a user via a user interface and transmits a set of signals such that the actor nodes are subscribed to the appropriate space addresses and the sensor nodes are configured to transmit the space addresses.

20 Claims, 16 Drawing Sheets

Related U.S. Application Data continuation of application No. 16/417,400, filed on May 20, 2019, now Pat. No. 10,591,882, which is a continuation of application No. 15/479,093, filed on Apr. 4, 2017, now Pat. No. 10,359,746.

(60) Provisional application No. 62/321,298, filed on Apr. 12, 2016.

(51) Int. Cl.
  *H04W 4/33* (2018.01)
  *H04L 67/125* (2022.01)
  *H04L 67/12* (2022.01)

(52) U.S. Cl.
  CPC ...... *G05B 2219/2642* (2013.01); *H04L 67/12* (2013.01); *H04L 67/125* (2013.01)

(56) References Cited

U.S. PATENT DOCUMENTS

| | | |
|---|---|---|
| 6,353,853 B1 | 3/2002 | Gravlin |
| 6,580,950 B1 | 6/2003 | Johnson et al. |
| 6,756,998 B1 | 6/2004 | Bilger |
| 6,792,319 B1 | 9/2004 | Bilger |
| 6,873,610 B1 | 3/2005 | Noever |
| 6,891,838 B1* | 5/2005 | Petite ............... H04L 12/2836 340/870.02 |
| 6,909,921 B1* | 6/2005 | Bilger ............... G08B 21/0492 700/63 |
| 6,912,429 B1 | 6/2005 | Bilger |
| 7,092,772 B2 | 8/2006 | Murray et al. |
| 7,437,596 B2 | 10/2008 | McFarland |
| 7,486,193 B2 | 2/2009 | Elwell |
| 7,555,658 B2 | 6/2009 | Vahid et al. |
| 7,680,745 B2 | 3/2010 | Hunter |
| 7,817,994 B2 | 10/2010 | Funk et al. |
| 8,001,219 B2 | 8/2011 | Moorer et al. |
| 8,013,732 B2 | 9/2011 | Petite et al. |
| 8,023,440 B2 | 9/2011 | Nass et al. |
| 8,050,801 B2 | 11/2011 | Richards et al. |
| 8,155,142 B2 | 4/2012 | Moorer et al. |
| 8,209,398 B2 | 6/2012 | Moorer et al. |
| 8,271,881 B2 | 9/2012 | Moorer et al. |
| 8,275,471 B2 | 9/2012 | Huizenga et al. |
| 8,681,676 B2* | 3/2014 | Budampati ......... H04L 12/1895 370/312 |
| 8,725,845 B2 | 5/2014 | Moorer et al. |
| 8,793,022 B2 | 7/2014 | Uden |
| 8,806,209 B2 | 8/2014 | Hemphill et al. |
| 9,049,038 B2 | 6/2015 | Cavalcanti |
| 9,210,192 B1 | 12/2015 | Kim et al. |
| 9,374,874 B1* | 6/2016 | Ewing ................ G08C 17/02 |
| 9,867,260 B2 | 1/2018 | Kicklighter et al. |
| 9,945,574 B1 | 4/2018 | Sloo et al. |
| 10,057,062 B2 | 8/2018 | Nadathur et al. |
| 10,200,504 B2 | 2/2019 | Decenzo et al. |
| 10,333,731 B2* | 6/2019 | Ebrom ............... H04L 12/2816 |
| 10,339,791 B2 | 7/2019 | Baum et al. |
| 10,365,619 B2 | 7/2019 | Mousavi et al. |
| 10,382,452 B1 | 8/2019 | Dawes et al. |
| 10,389,736 B2 | 8/2019 | Dawes et al. |
| 10,754,304 B2* | 8/2020 | Raji ................... G05B 11/012 |
| 2003/0040812 A1* | 2/2003 | Gonzales ............ G05B 15/02 700/20 |
| 2003/0137396 A1* | 7/2003 | Durej ................. G05B 15/02 340/10.3 |
| 2006/0028997 A1* | 2/2006 | McFarland ............ H04W 4/38 370/252 |
| 2006/0074494 A1 | 4/2006 | McFarland |
| 2007/0060147 A1* | 3/2007 | Shin .................. H04W 4/18 455/445 |
| 2007/0156256 A1 | 7/2007 | Jung |
| 2007/0232288 A1* | 10/2007 | McFarland ......... H04L 41/0803 455/67.11 |
| 2008/0191866 A1* | 8/2008 | Falck ................. H04L 61/00 340/539.1 |
| 2008/0298302 A1* | 12/2008 | Ishida ............... H04L 61/5038 370/328 |
| 2009/0066473 A1* | 3/2009 | Simons ............... H04L 12/2803 340/3.1 |
| 2009/0141741 A1* | 6/2009 | Kim .................. H04L 61/106 370/474 |
| 2009/0222541 A1* | 9/2009 | Monga ............... H04L 61/4541 709/224 |
| 2010/0008272 A1* | 1/2010 | Messinger ............ H04Q 9/00 370/311 |
| 2010/0074234 A1* | 3/2010 | Banks ............... H04W 52/0209 370/254 |
| 2010/0236824 A1* | 9/2010 | Roosli .................. H05K 7/1481 174/503 |
| 2011/0213867 A1* | 9/2011 | McCoy .................. H04L 69/18 709/223 |
| 2012/0066168 A1* | 3/2012 | Fadell ................ H05B 47/115 702/140 |
| 2013/0085615 A1* | 4/2013 | Barker ................ G05B 19/418 700/277 |
| 2013/0109406 A1* | 5/2013 | Meador .................. H04W 4/33 455/456.1 |
| 2013/0132609 A1* | 5/2013 | Meier ................. H04L 41/12 709/245 |
| 2013/0291100 A1* | 10/2013 | Ganapathy .......... H04W 12/126 726/22 |
| 2013/0335219 A1* | 12/2013 | Malkowski ........ G08B 13/2491 340/539.22 |
| 2014/0107846 A1* | 4/2014 | Li ..................... H04W 4/33 700/275 |
| 2014/0163751 A1* | 6/2014 | Davis ................. G08C 17/02 700/286 |
| 2014/0244044 A1* | 8/2014 | Davis ................. H05B 47/19 700/275 |
| 2014/0293276 A1* | 10/2014 | Hughes .................. H05B 47/11 356/222 |
| 2014/0328211 A1* | 11/2014 | Holleis ............... H04L 43/0811 370/254 |
| 2014/0336821 A1* | 11/2014 | Blaine ................ H04L 61/5038 700/275 |
| 2014/0358285 A1* | 12/2014 | Aggarwal ............ H05B 47/105 700/275 |
| 2015/0347916 A1* | 12/2015 | Warren ................ G06N 5/04 706/46 |
| 2016/0170389 A1 | 6/2016 | Im et al. |
| 2016/0234186 A1* | 8/2016 | Leblond ............... H04L 67/34 |
| 2016/0234649 A1* | 8/2016 | Finnerty .............. H04W 4/80 |
| 2016/0327921 A1* | 11/2016 | Ribbich ............... F24F 11/30 |
| 2016/0344670 A1* | 11/2016 | Wu .................... H04L 45/18 |
| 2016/0381144 A1* | 12/2016 | Malik ................. H04L 67/125 455/517 |
| 2017/0016643 A1 | 1/2017 | Combe et al. |
| 2017/0034123 A1* | 2/2017 | Ritmanich ............. H04L 67/12 |
| 2017/0171071 A1* | 6/2017 | Turon .................. H04W 4/80 |
| 2017/0311415 A1 | 10/2017 | Rozendaal et al. |
| 2018/0004178 A1* | 1/2018 | Haines ................ G05B 19/048 |
| 2019/0020494 A1* | 1/2019 | Roosli .................. H04L 41/12 |
| 2019/0190741 A1 | 6/2019 | Wendt |

OTHER PUBLICATIONS

Related U.S. Appl. No. 16/417,400, Office action dated Sep. 3, 2019.
Related U.S. Appl. No. 16/417,400, Notice of Allowance, dated Oct. 15, 2019.
Related U.S. Appl. No. 16/711,696, Office action dated Jul. 21, 2020.
Related U.S. Appl. No. 16/711,696, Notice of Allowance, dated Aug. 28, 2020.

* cited by examiner

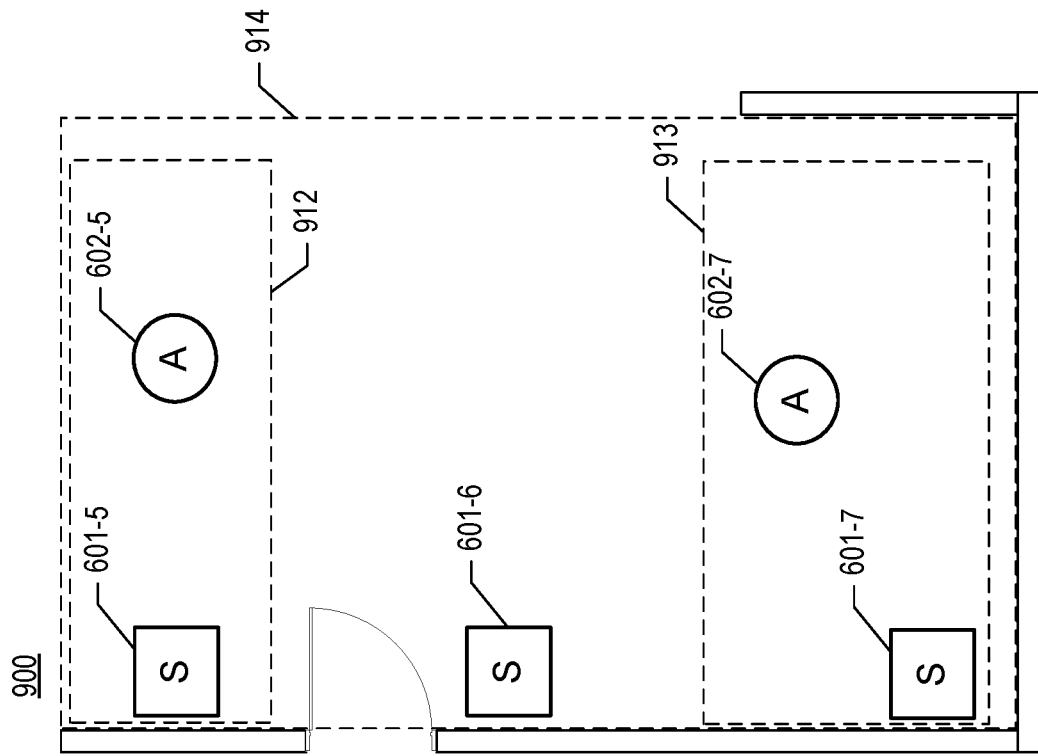
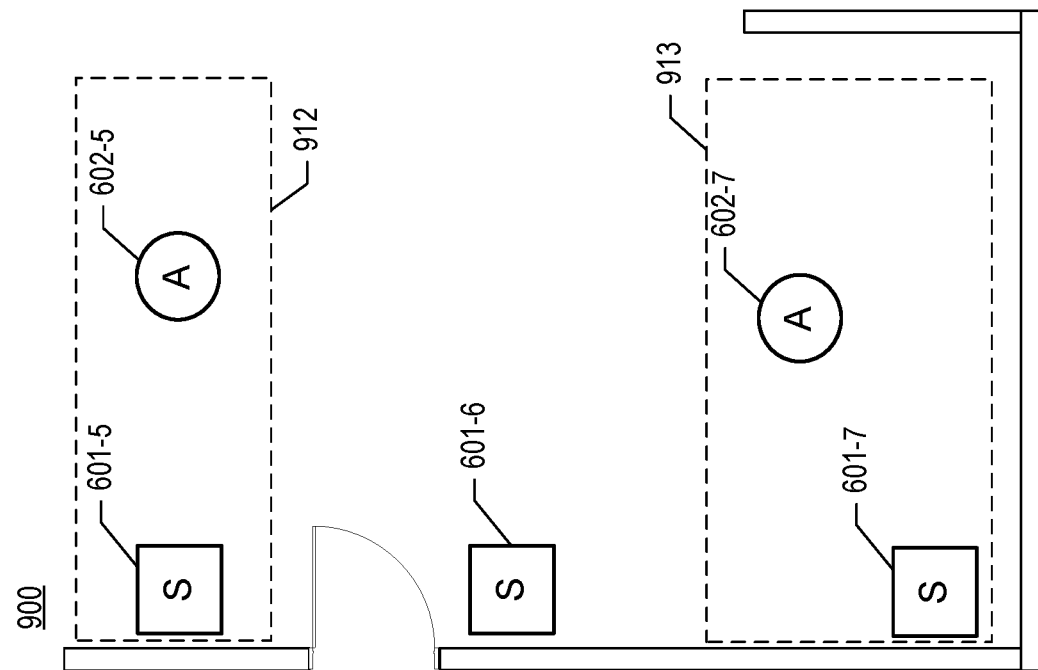

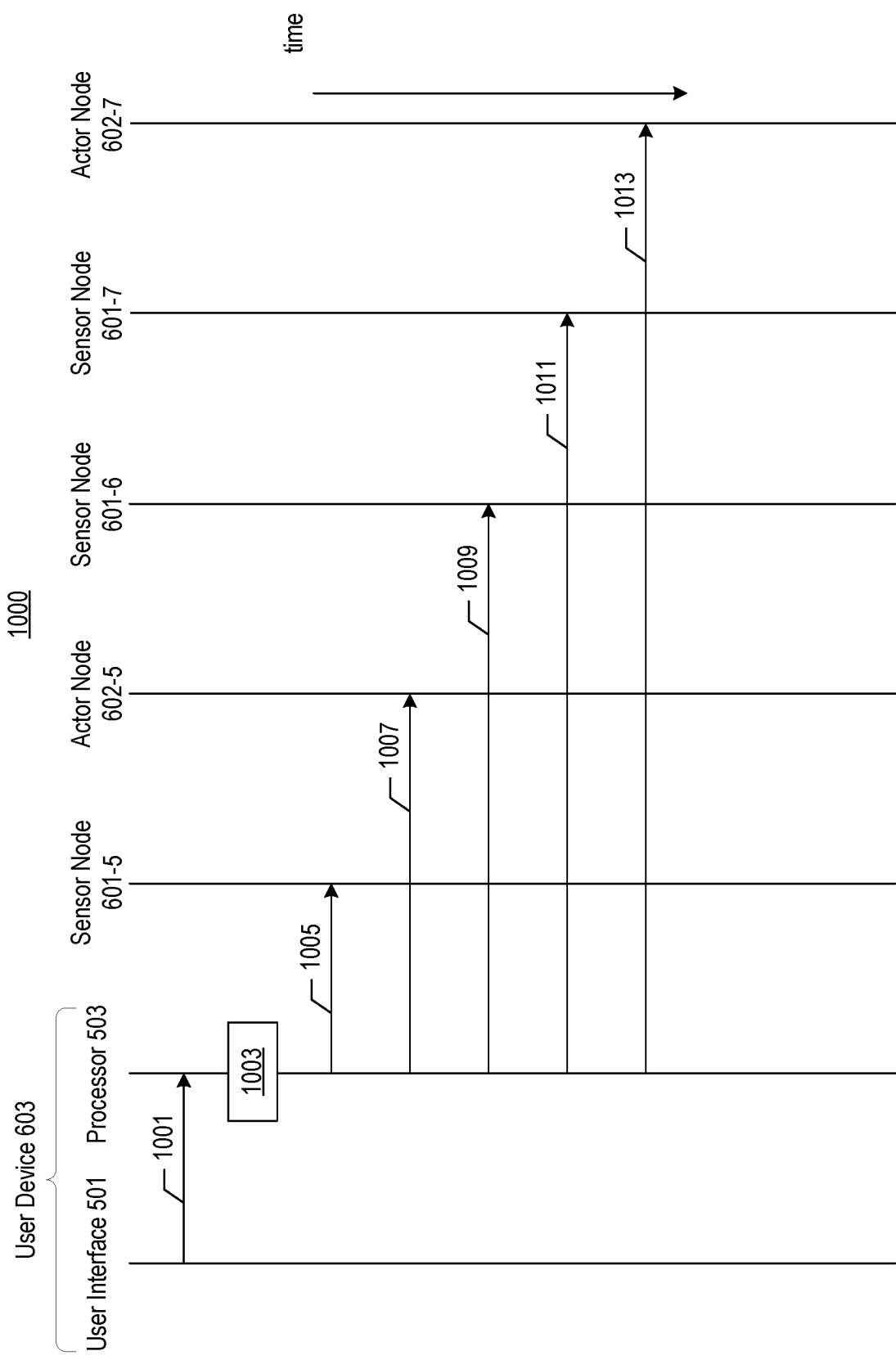

SPACE-DRIVEN BUILDING AUTOMATION AND CONTROL, INCLUDING THE CONFIGURING OF ONE OR MORE NETWORK NODES TO AN ADDRESS THAT IS REPRESENTATIVE OF A SPACE

CROSS REFERENCE TO RELATED APPLICATIONS

The following document is incorporated by reference herein: U.S. Provisional Application Ser. No. 62/321,298, filed Apr. 12, 2016. If there are any contradictions or inconsistencies in language between this application and any document that has been incorporated by reference that might affect the interpretation of the claims in this application, the claims in this application should be interpreted to be consistent with the language in this application. This application is also related to "System and method for space-driven building automation and control including actor nodes subscribed to a set of addresses including addresses that are representative of spaces within a building to be controlled," U.S. application Ser. No. 15/479,093, incorporated by reference herein. This application is also related to "System and method for space-driven building automation and control, including an actor node subscribed to an address that is representative of a space within a building," U.S. application Ser. No. 16/417,400, incorporated by reference herein. This application is also related to "System and method for space-driven building automation and control, including a network node comprising a sensor unit and an output unit and subscribed to an address that is representative of a space," U.S. application Ser. No. 16/711,696, incorporated by reference herein.

FIELD OF THE INVENTION

The present invention relates in general to automation and control in a building, and, more particularly, to a control system with addressing that is based on one or more predetermined spaces within an area that is being controlled.

BACKGROUND OF THE INVENTION

Building automation and control refers to the use of computer and information technology to control building systems, such as lighting, HVAC, audio-visual, smoke detection, security, and shading, among other systems. Using specialized hardware, building devices can be monitored and controlled automatically. Although building automation has been available at some level of sophistication for some time, it steadily becomes more practical, both from a technological and cost perspective. This is due in part to the rapid advancement of information technology.

A sophisticated building automation system might include sensor devices (e.g., of temperature, of light, of motion, of switch actuation, etc.), actor devices (e.g., lamps, climate control, motorized window shades, etc.), and, in some cases, separate controller devices (e.g., a general-purpose personal computer, a dedicated automation controller, etc.). The actor devices act upon the information gathered and transmitted by the sensor devices. For example, a sensor detects motion, propagates this information such that a light module receives it, which module turns on electrical current to a light bulb as a result. The system might also include a human-machine interface device that enables an occupant of the building to interact with the system. The interface can be a specialized terminal or an application ("app") running on a smartphone or tablet computer. The various system devices communicate over dedicated wiring, or over a wired network, or wirelessly, using one or more protocols.

Many building automation systems are based on peer-to-peer network architectures that include the sensor and actor devices. In a peer-to-peer network, sensor devices transmit information such that actor devices can act upon the information transmitted and without the need for an intermediary controller.

There are various classes of peer-to-peer automation systems in the prior art. In a first building automation system in the prior art, depicted in FIG. 1A, each sensor device communicates directly with a particular actor or actors. The actor device does not analyze the information it gets; rather, it merely responds to it. The entire logic is in the sensor device, in terms of which actor or actors should the sensor device trigger, for how long, on what condition, and so on. A particular example of this class of automation systems is based on Z-Wave™ radio technology, widely used in building installations, in which the sensors devices are thermostats, motion sensors, and wall switches, and the actor devices are typically actuators that affect the flow of electrical current, such as to a light bulb and so on.

In a second building automation system in the prior art, depicted in FIG. 1B, each sensor device broadcasts its signal, but does not know who the recipient of the signal is. Each actor device monitoring for signals that are being broadcast by sensor devices is programmed to listen to specific events from specific sensor devices, which identify themselves by also broadcasting their source addresses. Most of the control logic in this class of automation systems is in the actor device, in contrast to the sensor device as in the system depicted in FIG. 1A. A particular example of this class of automation systems is based on EnOcean™ radio technology, in which the wireless sensor is powered by the physical force of pushing a button or by another energy-harvesting approach, although the sensor devices in other automation systems in this class can be battery powered.

SUMMARY OF THE INVENTION

The present invention enables one or more actor nodes within a building or other area that is being controlled, to be subscribed to a set of addresses, including one or more addresses that are representative of one or more respective spaces within the building being controlled. Such addresses are referred to as "space addresses." Each of the actor nodes acts upon received data packets only if a space address is received along with the data packets and the actor node has been subscribed to the space address. Also in the system disclosed herein, one or more sensor nodes are configurable to transmit the one or more space addresses and the data packets. A user device receives commands from a user via a user interface and transmits a set of signals such that the actor nodes are subscribed to the appropriate space addresses and the sensor nodes are configured to transmit the space addresses. The set of signals is based on the commands received by the user device from the user, and the user interface enables the user to represent, graphically or otherwise, the space that is being represented by a space address.

In accordance with the illustrative embodiment of the present invention, the disclosed system operates in a publish-and-subscribe fashion, in which data packets transmitted by each sensor node comprise two types of addresses: the source address of the sensor node and one or more space addresses. In transmitting the data packets, a sensor node, in essence, publishes to a space, as represented by a space address; for example, a sensor node comprising a room temperature sensor publishes the temperature information to a space defined as the "room." This is in contrast to a sensor node transmitting to a particular actor node by specifying a destination device address, as in some techniques in the prior art.

Meanwhile, each actor node maintains a subscription list of the space addresses to which the actor node is subscribed. The actor node can be subscribed to multiple spaces, including a hierarchy of spaces having one space within another. So, for example, a lamp node in a kitchen can be subscribed to the following spaces: "kitchen", "first floor", and "house", assuming that the kitchen is on the first floor of the house. The user device i) enables the user to subscribe the actor nodes to the spaces, ii) generates space addresses representative of those spaces, and iii) configures the sensor nodes to publish to the spaces by including the space addresses in the data packets being transmitted.

Continuing with the kitchen example above, there may be a switch node in the kitchen publishing to the "kitchen" space—that is, by transmitting data packets comprising a space address that is representative of the "kitchen" space. The switch publishes an "on" command to the "kitchen" space (i.e., by publishing the kitchen space address); as a result, all lamps subscribed the "kitchen" space turn on. If, for convenience, a user wants to add a second switch in the kitchen, the user merely configures the second switch to publish to the "kitchen" space, resulting in the user device configuring the second switch to include the "kitchen" space address, and the lamps start acting upon the data packets from the second switch comprising the "kitchen" space address. In other words, the user does not have to do anything to the lamps because they are already subscribed to the "kitchen" space and, as a result, recognize the corresponding space address.

In yet another aspect of the example, the user might then want to install an "all off" switch by the house's door to the outside, for turning off all of the lights in the house. The user can configure the publish address of that switch to be that of the "house" space. And when the user presses the switch, all actor devices subscribed to the "house" space turn off.

The space-based control system disclosed herein is advantageous, over at least some of the control systems in the prior art, in the way that a user can build a particular building control configuration. For example, initially by default there is only one space—namely, the "building"—and consequently all nodes interact each other. This is convenient for a first switch device and the first lamp device, in that no configuring on the part of the user is required. Buying a second switch device and a second lamp device does not necessary require any configuration as well. Only when a user decides to split the system—that is, to have a switch device A interacting with a lamp device A and a switch device B interacting with a lamp device B—must she decide to split the default space into space A and space B, and assign the devices to spaces A and B, respectively. Should the user then decide to add a lamp device C to be controlled by switch device A, she can do so on the configuring app by moving, on a graphical user interface, lamp device C into space A.

And once the devices are running, switch device A need only transmit a single space address that corresponds to space A, which has the effect of controlling both lamp devices A and C that are subscribed to that space address. This offers a technical improvement of requiring only one space address to be transmitted, versus two destination device addresses for devices A and C. This technical improvement can also apply during the configuration process.

A first illustrative system for automation and control within a building comprises: a first sensor node that is configured to transmit i) a first source address, ii) a first space address, and iii) a first plurality of data packets, wherein the first space address is representative of a first predetermined space within the building; and a first actor node that is configured to be subscribed to a first non-empty set of addresses, including the first space address, and to act upon the first plurality of data packets only if the first space address is received and is subscribed to.

A second illustrative system for automation and control within a building comprises: a first actor node that is configured i) to be subscribed to a first non-empty set of addresses, including a first space address that is representative of a first predetermined space within the building, and ii) to act upon a received first plurality of data packets only if the first space address is a) received along with the first plurality of data packets and b) subscribed to; and a user device that is configured to i) receive commands from a user via a user interface and ii) transmit a first set of signals such that the first actor node is subscribed to the first space address, wherein the first set of signals is based on the commands received from the user, and wherein the user interface enables the user to represent graphically the first space, resulting in the commands from the user.

An illustrative method for automation and control within a building comprises: receiving, by a user device from a user via a user interface, one or more commands to assign a first sensor node and a first actor node to a first space within the building, wherein the first sensor node and the first actor node are already subscribed to a default space address that is representative of a default space, and wherein the first space is within, but not the same as, the default space, and wherein the user interface enables the user to represent graphically the first space, resulting in the one or more commands from the user; generating, by the user device, a first space address that is representative of the first space; and transmitting, by the user device, i) a first set of signals such that the first sensor node is configured to transmit the first space address and ii) a second set of signals such that the first actor node is subscribed to the first space address and, as a result, is enabled to act upon a first plurality of data packets received from the first sensor if the first space address is received along with the first plurality of data packets; wherein the first set of signals and the second set of signals are transmitted in response to the one or more commands from the user.

BRIEF DESCRIPTION OF THE DRAWINGS

FIGS. 9A through 9E depict various examples of configuring a predetermined collection of sensor nodes and actor nodes within a particular area of building 600.

FIG. 10 depicts message flow 1000 corresponding to the configuration depicted in FIG. 9B.

DETAILED DESCRIPTION

Figure 1B:
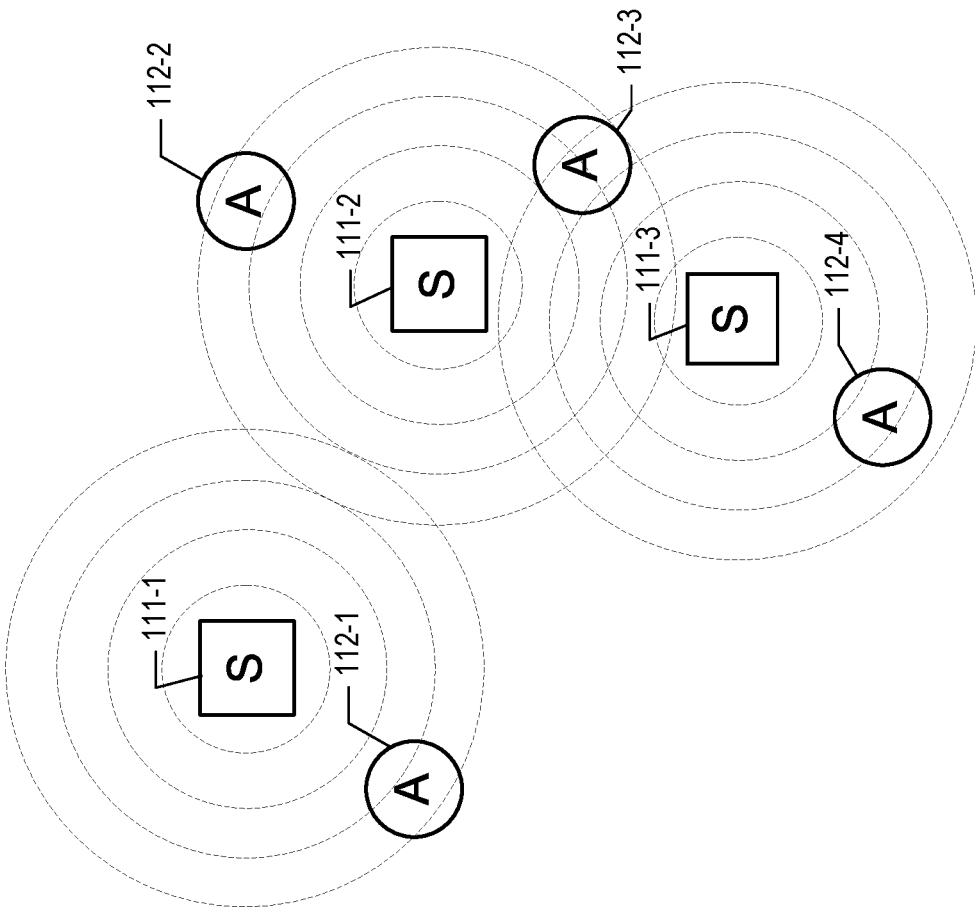
FIGS. 1A and 1B depicted classes of building automation systems in the prior art.
Figure 1A:
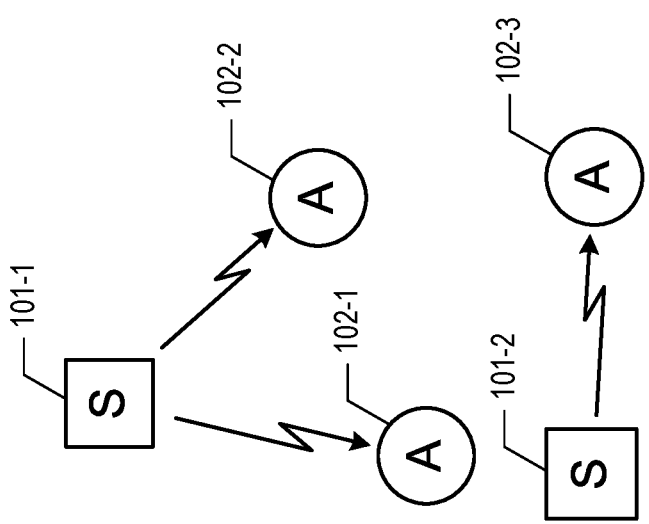

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Generate—For the purposes of this specification, the infinitive "to generate" and its inflected forms (e.g., "generating", "generation", etc.) should be given the ordinary and customary meaning that the terms would have to a person of ordinary skill in the art at the time of the invention.

Space address—For the purposes of this specification, the term "space address" is defined as an address that is representative of a predetermined space within a building or other area being controlled.

Network address—For the purposes of this specification, the term "network address," or "computer network address," is defined as a numerical label assigned to each device (e.g., sensor node, actor node, configuring node, etc.) participating in a computer network, which uniquely identifies that device within the computer network. For example, an Internet Protocol address (IP address) is a numerical label assigned to each device participating in a computer network that uses the Internet Protocol for communication. A "source address" is an example of a network address, in that it specifies the device that originated a transmitted packet or message conveyed by one or more packets.

Packet—For the purposes of this specification, the term "packet," or "data packet," is defined as a unit of data made into a single package that travels along a given network path. The header of each packet (e.g., IP packet) contains, among other things, the numerical source address of the packet.

Processor—For the purposes of this specification, the term "processor" is defined as hardware or hardware and software that perform mathematical and/or logical operations.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Space—For the purposes of this specification, the term "space" is defined as a continuous area or expanse within a predefined boundary, such as that of a building or other area being controlled.

Subscribe—For the purposes of this specification, the infinitive "to subscribe" and its inflected forms (e.g., "subscribing", "subscribed", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Figure 2:
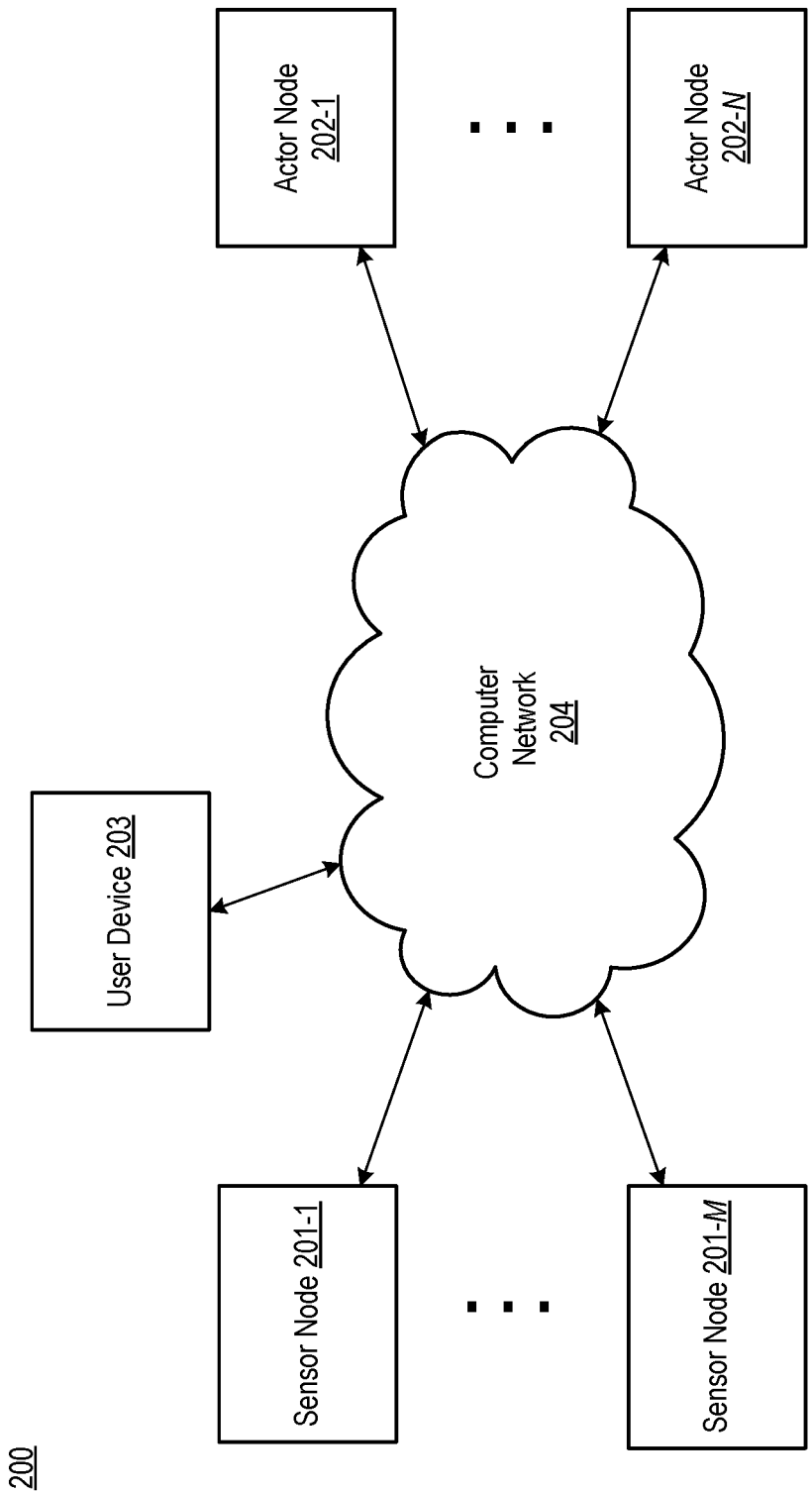
FIG. 2 depicts automation system 200, in accordance with the illustrative embodiment of the present invention.

FIG. 2 depicts automation system 200, in accordance with an illustrative embodiment of the present invention. System 200 comprises: sensor nodes 201-1 through 203-M, wherein M is a positive integer; actor nodes 202-1 through 202-N, wherein N is a positive integer; user device 203; and computer network 204. The aforementioned elements are interconnected as shown and, as depicted, are physically distinct devices with respect to one another. The elements that make up system 200 communicate wirelessly; in some alternative embodiments of the present invention, however, one or more of the depicted elements can communicate via wired connections.

In accordance with the illustrative embodiment of the present invention, automation system 200 is an automation and control system in a house. As those who are skilled in the art will appreciate after reading this specification, however, automation system 200 can also be applied to a different type of building, such as a different type of dwelling (e.g., apartment, etc.) or a commercial building (e.g., an office space, a retail space, etc.), or to include the environment surrounding the building, or to any environment in which automated control can be applied.

Furthermore, all depicted devices telecommunicate with one other via computer network 204, which is a wireless personal area network (WPAN) that provides the devices of system 200 with connectivity to one other. In accordance with the illustrative embodiment of the present invention, network 204 comprises a communications medium for transmitting packets of data in accordance with the Bluetooth Low Energy (BLE) protocol with which the depicted devices telecommunicate.

In some other embodiments of the present invention, computer network 204 is a different type of WPAN than one that is BLE-based. For example and without limitation, network 204 can be based on Z-Wave, ZigBee, Thread, Wi-Fi, or classic Bluetooth. As those with ordinary skill in the art will appreciate after reading this disclosure, in some embodiments of the present invention, network 204 can comprise one or more of the aforementioned networks and/or other computer or telecommunication networks, without limitation. Furthermore, as those with ordinary skill in the art will appreciate after reading this disclosure, computer network 204 can comprise elements that are capable of wired and/or wireless communication, without limitation.

Sensor node 201-$m$, wherein m has a value between 1 and M, inclusive, is an apparatus that comprises memory, processing components, and communication components. Sensor node 201-$m$ is configured to transmit signals providing sensor-related information. Sensor node 201-$m$ is described in detail below and in FIG. 3. In some embodiments of the present invention, one or more of the sensor nodes can be virtual sensors, which refers web or network services that provide information such as time-of-day, date, day/night indication, sun elevation/azimuth, and so on, for example and without limitation.

Actor node 202-*n*, wherein n has a value between 1 and N, inclusive, is an apparatus that comprises memory, processing components, and communication components. Actor node 202-*n* is configured to receive signals conveying data packets (e.g., in a stream of packets, etc.) that the node uses to control corresponding device functions and/or affect a condition, physical or otherwise, in the node's environment, in part by generating a signal (e.g., a control signal, etc.). In doing so, actor node 202-*n* is said to act upon (i.e., take action because of) the received data. Actor node 202-*n* is described in detail below and in FIG. 4.

In some embodiments, at least one of the sensor nodes and/or actor nodes is configured to both i) transmit signals that provide sensor-related information and ii) receive signals that the node uses to control corresponding device functions and/or affect a condition, physical or otherwise, in the node's environment. Also, in some embodiments, at least some of the sensor nodes and/or actor nodes can distribute data according to a mesh network. A "mesh network" is a network topology in which each node replays data for the network. The nodes that are involved cooperate in the distribution of data in the network. A mesh network can relay messages using either a flooding technique or a routing technique.

User device 203 is a mobile station that is configured to transmit and/or receive communications wirelessly. It is an apparatus that comprises memory, processing components, and communication components. User device 203 comprises the hardware and software necessary to be compliant with the protocol standards used in the wireless network in which it operates and to perform the processes described below and in the accompanying figures. User device 203 is described in detail below and in FIG. 5.

Furthermore, user device 203 is illustratively a smartphone with at least packet data capability provided and supported by the network in which it operates and that is configured to execute a software application (e.g., an "app") for controlling and/or configuring one or more of the other devices depicted in FIG. 2. In some alternative embodiments of the present invention, user device 203 can be referred to by a variety of alternative names such as a wireless transmit/receive unit (WTRU), a user equipment (UE), a wireless terminal, cell phone, or a fixed or mobile subscriber unit, or can be any other type of device (e.g., personal computer, laptop, notebook, tablet, phablet, etc.) that is capable of operating in a wireless network environment, either mobility-oriented or otherwise.

Figure 3:
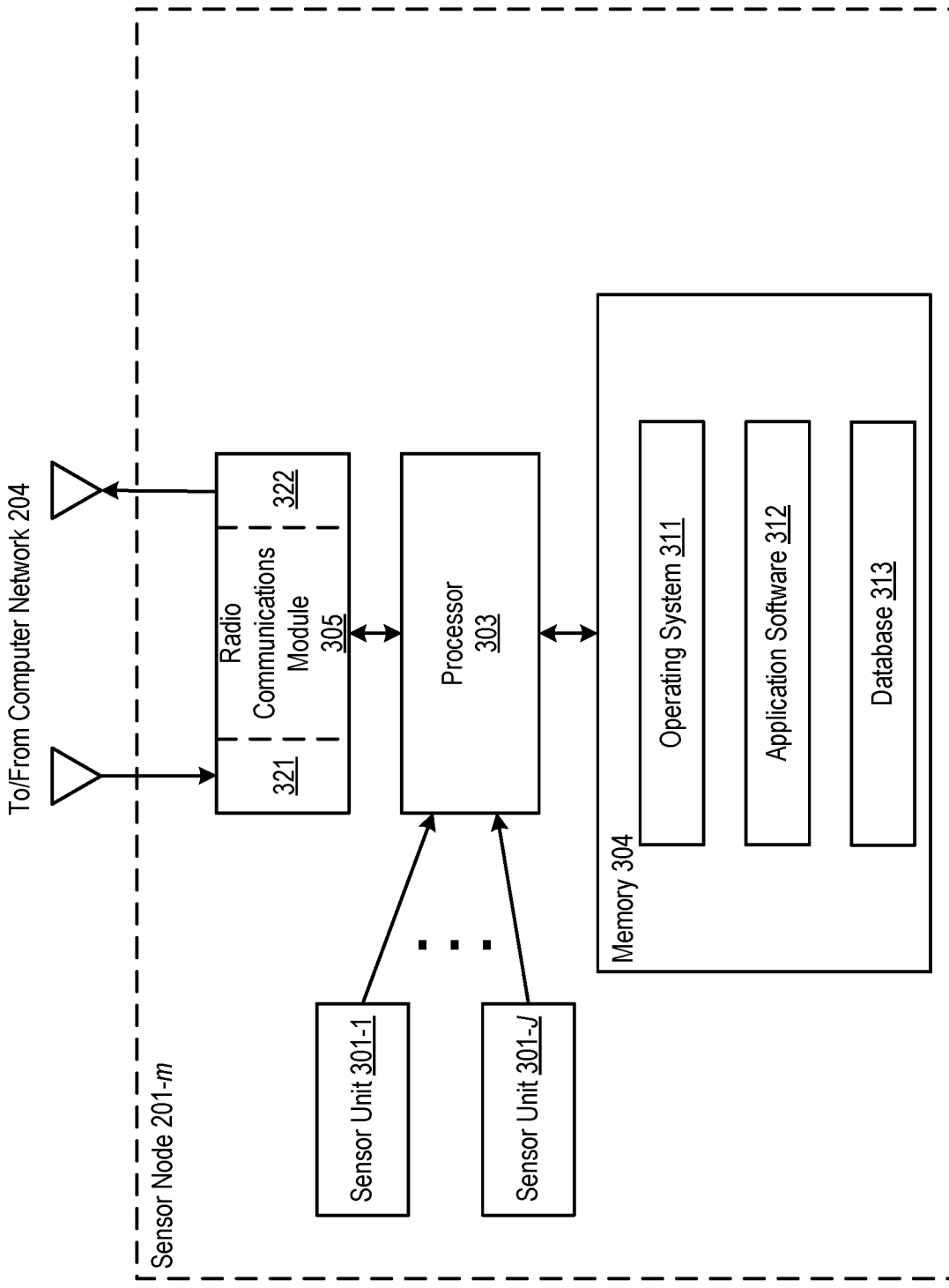
FIG. 3 depicts the salient components of sensor node 201-$m$ within system 200.

FIG. 3 depicts the salient components of sensor node 201-*m* according to the illustrative embodiment of the present invention. Sensor node 201-*m* is based on a data-processing apparatus whose hardware platform comprises: sensor unit 301-1 through 301-J, wherein J is a positive integer; processor 303, memory 304, and radio communications module 305, interconnected as shown. In some alternative embodiments, there can also be one or more actor units present and as part of the sensor node, which are described below and in FIG. 4.

Sensor unit 301-*j*, wherein j has a value between 1 and J, inclusive, is an apparatus that comprises memory, processing components, and communication components, and is configured to gathers information about the environment that is accessible by the sensor unit. Each sensor unit generates an indication of an event (generates an "event") based on a state change as a result of an external event occurring (e.g., pushbutton pressed, motion detected, etc.) or an internal event occurring (e.g., a counter reaching a particular value, etc.). For example and without limitation, a sensor unit autonomously generates events based on a state change of one or more of the following, in any combination:

i. environmental probes (e.g., temperature, ambient light, motion or occupancy, humidity, etc.).

ii. electrical inputs (i.e., binary, analog, bus), including from a switch (i.e., mechanical or otherwise).

iii. signals received via radio (e.g., proximity beacons, etc.).

iv. a state of the internal logic, woken up periodically based on time or on an external event.

As those who are skilled in the art will appreciate, after reading this disclosure, sensor unit 301-*j* can generate events based on different criteria than those listed above.

Processor 303 is a processing device, such as a microprocessor that is well known in the art. Processor 303 is configured such that, when operating in conjunction with the other components of sensor node 201-*m*, processor 303 executes software, processes data, and telecommunicates according to the operations described herein. In particular, processor 303 determines which data values, of which data elements, are to be included in packets to be transmitted, including a source address of corresponding sensor node 201-*m* and one or more space addresses.

In at least some embodiments of the present invention, one or more of the data values can be based on i) the events generated by the one or more sensor units and ii) associations between each event and the data values, as described below. Processor 303 also composes data packets (e.g., constituting a stream of data packets, etc.) that comprise the relevant data values.

Memory 304 is non-transitory and non-volatile computer storage memory technology that is well known in the art (e.g., flash memory, etc.). Memory 304 is configured to store operating system 311, application software 312, and database 313. The operating system is a collection of software that manages, in well-known fashion, sensor node 201-*m*'s hardware resources and provides common services for computer programs, such as those that constitute the application software. The application software that is executed by processor 303 according to the illustrative embodiment enables sensor node 201-*m* to perform the functions disclosed herein. Database 313 comprises information about each possible event and associated data values.

It will be clear to those having ordinary skill in the art how to make and use alternative embodiments that comprise more than one memory 304; or comprise subdivided segments of memory 304; or comprise a plurality of memory technologies that collectively store the operating system, application software, and database.

Radio communications module 305 is configured to enable sensor node 201-*m* to telecommunicate with other devices and systems, by receiving signals therefrom and/or transmitting signals thereto via receiver 321 and transmitter 322, respectively. For example, radio communications module 305 communicates with user device 203 and transmits data packets (e.g., in a stream of data packets) that can be used by one or more of actor nodes 202-1 through 202-*n*. Radio communications module 305 communicates via Bluetooth Low Energy (BLE). In some other embodiments, radio communications module 305 communicates via one or more other radio telecommunications protocols other than or in addition to BLE such as, but not limited to, Z-Wave, ZigBee, Thread, Wi-Fi, classic Bluetooth, and so on.

Receiver 321 is a component that enables sensor node 201-*m* to telecommunicate with other components and systems by receiving signals that convey information therefrom. It will be clear to those having ordinary skill in the art how to make and use alternative embodiments that comprise more than one receiver 321.

Transmitter 322 is a component that enables sensor node 201-*m* to telecommunicate with other components and systems by transmitting signals that convey information thereto. For example and without limitation, transmitter 322 is configured to transmit packets comprising the data values mentioned earlier, including the sensor node's source address. In some alternative embodiments of the present invention, transmitter 322 also transmits one or more destination addresses. It will be clear to those having ordinary skill in the art how to make and use alternative embodiments that comprise more than one transmitter 322.

In accordance with the illustrative embodiment, sensor node 201-*m* uses radio communications module 305 in order to telecommunicate wirelessly with external devices. It will clear to those skilled in the art, however, after reading the present disclosure, how to make use and use various embodiments of the present invention in which sensor node 201-*m* communicates via a wired protocol (e.g., X10, KNX, etc.) over physical media (e.g., cable, wire, etc.) with one or more external devices, either in addition to or instead of the wireless capability provided by radio communications module 305.

In generating and transmitting a packet, along with including its own network address as the source address in the packet, sensor node 201-*m* is said to originate the packet. In some embodiments of the present invention, sensor node 201-*m* can forward a packet that has been originated by a different sensor node.

Figure 4:
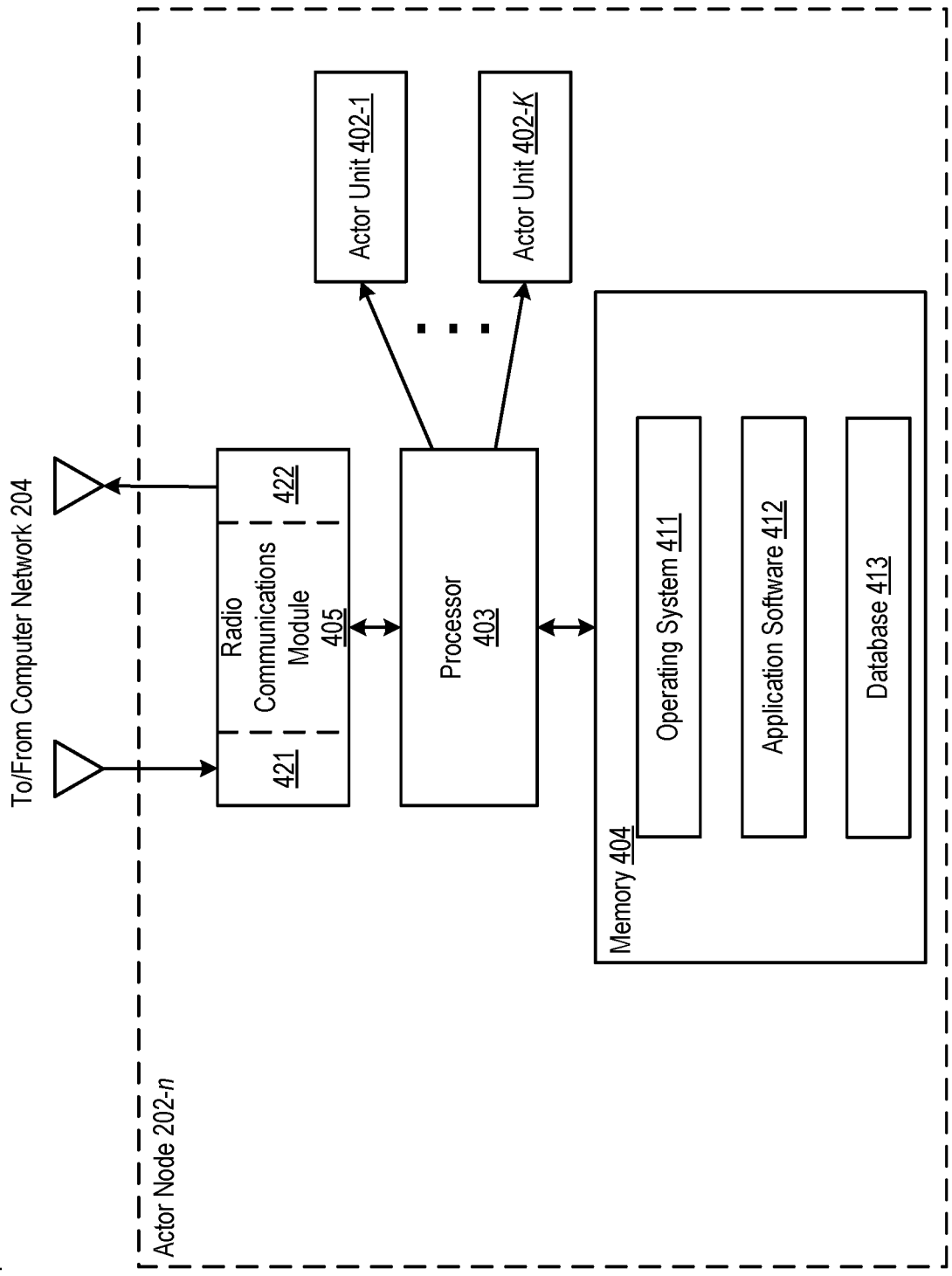
FIG. 4 depicts the salient components of actor node 202-$n$ within system 200.

FIG. 4 depicts the salient components of actor node 202-*n* according to the illustrative embodiment of the present invention. Actor node 202-*n* is based on a data-processing apparatus whose hardware platform comprises: actor unit 402-1 through 402-K, wherein K is a positive integer; processor 403, memory 404, and radio communications module 405, interconnected as shown. In some alternative embodiments, there can also be one or more sensor units present and as part of the actor node, which are described above and in FIG. 3.

Actor unit 402-*k*, wherein k has a value between 1 and K, inclusive, is an apparatus that comprises memory, processing components, and communication components, and is capable of doing something in the course of being affected by signals (e.g., data packets, etc.) originating externally to the actor component, such as from one or more of sensor nodes 201-1 through 201-M, as described in detail below. Each actor unit 402-*k* takes decisions that are based on signals from one or more sources and performs appropriate actions upon the actor's environment. Each actor unit acts upon its environment in well-known fashion. In some embodiments, an actor unit is or comprises an actuator, as is known in the art.

Actor unit 402-*k* is configured to receive, transmit, process, and/or relay signals conveying data, as well as being configured to affect a condition, physical or otherwise, in its environment, for example by generating a control signal. For example and without limitation, the condition being affected can be:

i. lighting, which can be adjusted (e.g., turning on or off, changing brightness, changing color or mood, displaying a picture or pattern, etc.).

ii. room climate, which can be controlled (e.g., increasing or decreasing temperature, humidity, air fragrance, fan speed, etc.).

iii. sound, which can be adjusted (e.g., increasing or decreasing volume, changing playlist or mood, turning on/off, selecting signal source, etc.).

iv. an alert, which can be generated (e.g., of an email, of an SMS message, etc.).

v. monitoring by a camera, which can be panned or tilted.

vi. office meeting/presentation settings (e.g., selecting one or more of signal source, streaming application, multimedia to play, audio language, subtitles, chapter, play/pause/stop, rewind/fast forward, etc.).

vii. connected/smart video monitor features (e.g., selecting application to be launched, navigating through on-screen menus, etc.).

viii. virtual keyboard—navigation on virtual keyboard displayed by other device (e.g., video monitor, set-top box, etc.).

ix. control of shades/window coverings/blinds.

x. access control (e.g., unlocking/locking doors, opening/shutting doors, authorizing access to selected rooms or zones, etc.).

As those who are skilled in the art will appreciate, after reading this disclosure, actor unit 402-*k* can provide a different function than those described above. Furthermore, actor node 202-*n* can comprise any combination of and any number of actor functions. As those who are skilled in the art will appreciate, after reading this disclosure, actor node 202-*n* comprising one or more actor functions can be in a variety of forms, such as a light bulb as part of a lighting system, a heater and/or ceiling fan as part of an environment control system, a media player as part of an audio/video system, an outgoing-email server as part of a messaging system, an actor in a water sprinkler system, a pump, a robot or robotic arm, a pan/tilt camera, a switch, a motor, a servo mechanism, and so on.

Processor 403 is a processing device that can be similar in hardware configuration to processor 303. Processor 403 determines which packets are to be processed and how each processed packet is to be used, in part based on the data values (e.g., space address, source address, etc.) contained in each packet.

Memory 404 is non-transitory and non-volatile computer storage memory technology that is well known in the art (e.g., flash memory, etc.) and that can be similar in hardware configuration to memory 304. Memory 404 is configured to store operating system 411, application software 412, and database 413. The operating system is a collection of software that manages, in well-known fashion, actor node 202-*n*'s hardware resources and provides common services for computer programs, such as those that constitute the application software. The application software that is executed by processor 403 according to the illustrative embodiment enables actor node 202-*n* to perform the functions disclosed herein. Database 413 comprises information about each relevant data value, as described below.

Radio communications module 405 is configured to enable actor node 202-*n* to telecommunicate with other devices and systems, by receiving signals therefrom and/or transmitting signals thereto via receiver 421 and transmitter 422, respectively. Receiver 421 and transmitter 422 can be similar in hardware configuration to receiver 321 and transmitter 321, respectively. Radio communications module 405 communicates with user device 203 and detects data packets that are transmitted by one or more of sensor nodes 201-1 through 201-M. Radio communications module 405 communicates via Bluetooth Low Energy (BLE). In some other embodiments, radio communications module 405 communicates via one or more other radio telecommunications protocols other than or in addition to BLE such as, but not limited to, Z-Wave, ZigBee, Thread, Wi-Fi, classic Bluetooth, and so on.

Figure 5:
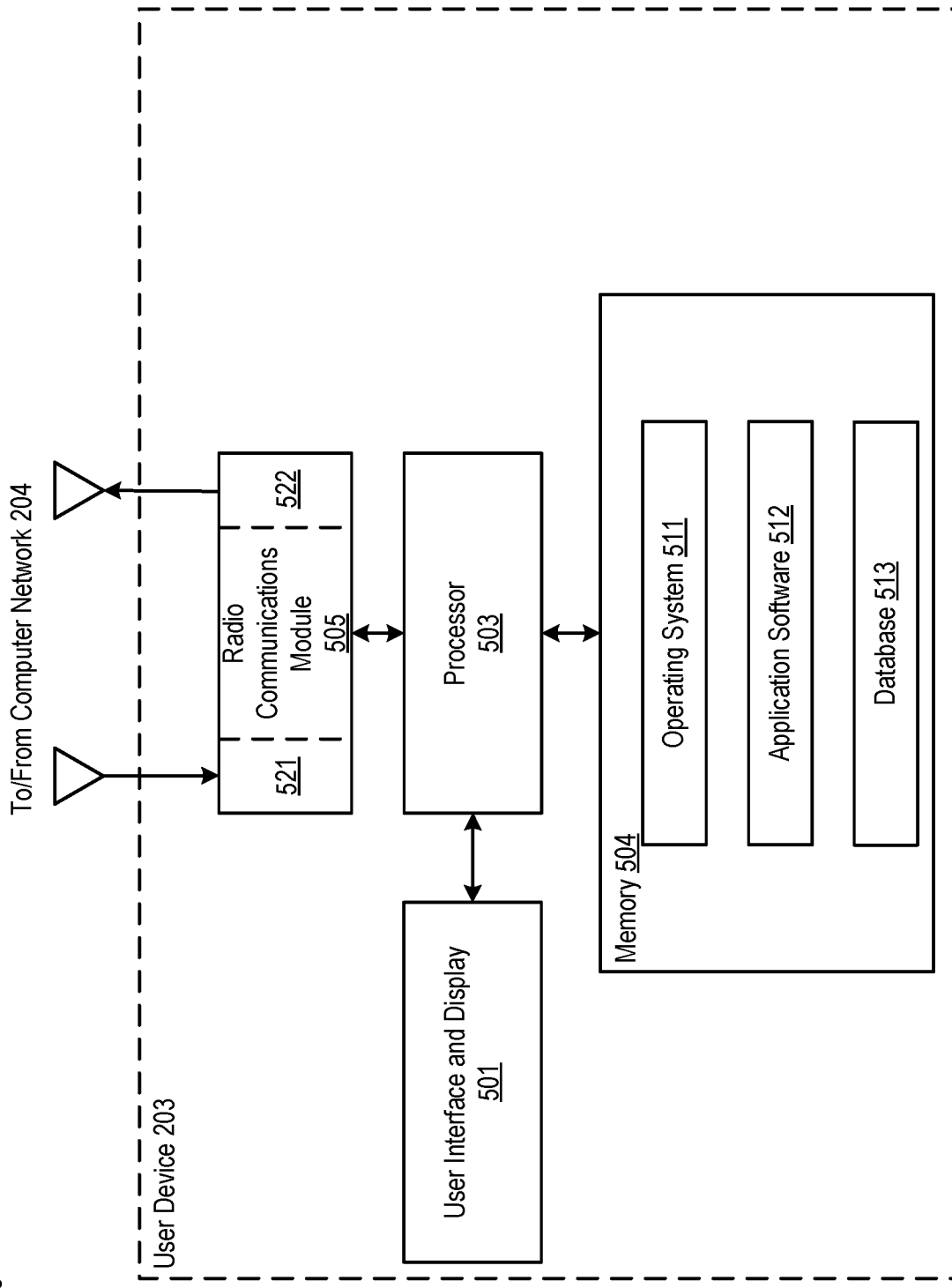
FIG. 5 depicts the salient components of user device 203 within system 200.

FIG. 5 depicts the salient components of user device 203 according to the illustrative embodiment of the present invention. User device 203 is based on a data-processing apparatus whose hardware platform comprises: user interface and display 501, processor 503, memory 504, and radio communications module 505, interconnected as shown.

User interface and display 501 is configured to enable user device 203 to interact with its user, by detecting inputs from the user via a user interface and presenting information, displayable or otherwise, to the user. In some embodiments of the present invention, device 501 comprises a touchscreen.

Processor 503 is a processing device, such as a microprocessor that is well known in the art. Processor 503 is configured such that, when operating in conjunction with the other components of user device 203, processor 503 executes software, processes data, and telecommunicates according to the operations described herein. For example, processor 503 determines which configuration messages are to be transmitted to which sensor nodes and actor nodes, and/or to which space addresses, as described below.

Memory 504 is non-transitory and non-volatile computer storage memory technology that is well known in the art (e.g., flash memory, etc.). Memory 504 is configured to store operating system 511, application software 512, and database 513. The operating system is a collection of software that manages, in well-known fashion, user device 203's hardware resources and provides common services for computer programs, such as those that constitute the application software. The application software that is executed by processor 503 according to the illustrative embodiment enables user device 203 to perform the functions disclosed herein. Database 513 comprises information about configuring each sensor node and actor node, including spaces that are created by the user and the corresponding space addresses assigned to those spaces, as described below.

Radio communications module 505 is configured to enable user device 203 to telecommunicate with other devices and systems, by receiving signals therefrom and/or transmitting signals thereto via receiver 521 and transmitter 522, respectively. For example, radio communications module 505 communicates with sensor nodes 201-1 through 201-M and actor nodes 202-1 through 202-N. Radio communications module 505 communicates with the sensor and actor nodes via Bluetooth Low Energy (BLE) and communicates within the cellular network in accordance with a cellular protocol. In some other embodiments, radio communications module 505 communicates via one or more other radio telecommunications protocols.

Receiver 521 is a component that enables user device 203 to telecommunicate with other components and systems by receiving signals that convey information therefrom. It will be clear to those having ordinary skill in the art how to make and use alternative embodiments that comprise more than one receiver 521.

Transmitter 522 is a component that enables user device 203 to telecommunicate with other components and systems by transmitting signals that convey information thereto. It will be clear to those having ordinary skill in the art how to make and use alternative embodiments that comprise more than one transmitter 522.

Figure 6:
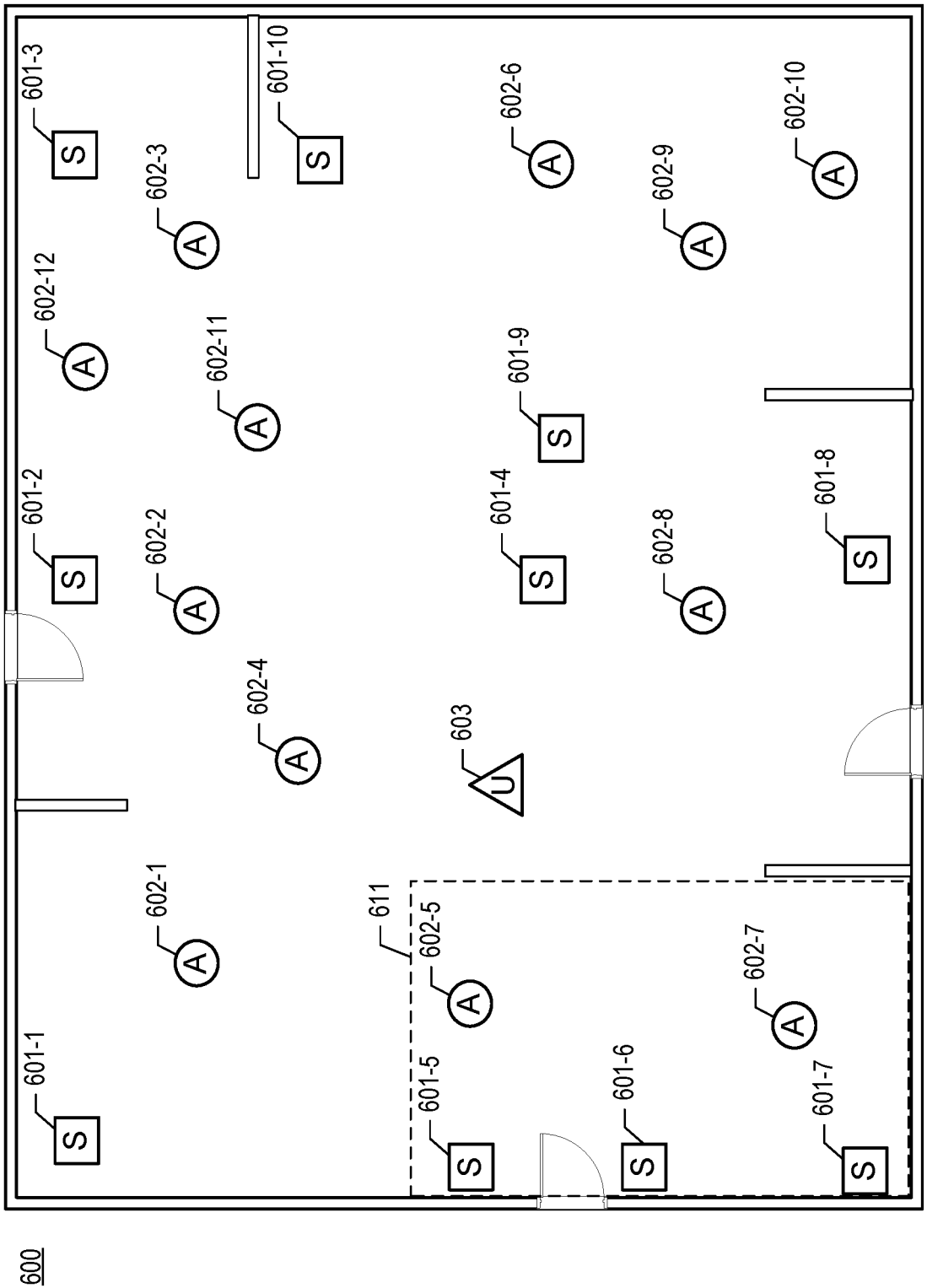
FIG. 6 depicts an illustrative floor plan of building 600.

FIG. 6 depicts an illustrative floor plan of building 600, which illustratively is a house. Building 600 is equipped with sensor nodes 601-1 through 601-10 (collectively referred to as "sensor nodes 601"), actor nodes 602-1 through 602-12 (collectively referred to as "actor nodes 602"), and user device 603. Sensor nodes 601, actor nodes 602, and user device 603 are non-limiting examples of sensor nodes 201, actor nodes 202, and user device 203, respectively. Each sensor node transmits packets containing one or more space addresses, wherein each space address is representative of a predetermined space, as well as the source address of the sensor node. In transmitting a space address, it can be said that the sensor node "publishes" the space address. Each source address uniquely identifies the corresponding sensor node within the address space of the one or more sensor nodes within an area being controlled, which in this case is building 600. Each actor node detects packets and makes decisions based on the one or more space addresses present in each packet, depending on whether the actor node is subscribed to those space addresses. In some embodiments of the present invention, an actor node can make decisions based on the sensor node's source address present in a packet.

In some embodiments of the present invention, a space address can also be representative of a predetermined function such as climate control or lighting, for example and without limitation. An actor node can be further configured to act upon a received space address, based on the predetermined function.

Some of sensor nodes 601 include a switch and are capable of sensing that the switch has been actuated, including sensor nodes 601-5, 601-6, and 601-7 in kitchen space 611. At least some of the other sensor nodes 601 are capable of sensing motion, from which occupancy can be inferred. Some of actor nodes 602 are capable of providing illumination, including actor nodes 602-5 and 602-7 in kitchen space 611, based at least in part on one or more messages received from certain sensor nodes. As those who are skilled in the art will appreciate, after reading this specification, the sensor nodes and/or actor nodes can provide different functionality from that just described. In addition, different sensor nodes can provide different functionality from one another, or different actor nodes can provide different functionality from one another, or both. Furthermore, building 600 can comprise different numbers of sensor nodes and actor nodes than those depicted and/or nodes that are placed differently than depicted.

User device 603 is capable of configuring sensor nodes 601 and actor nodes 602, as described elsewhere in this specification. As those who are skilled in the art will appreciate after reading this specification, however, a different device can be used to configure the sensor and actor nodes.

Building 600 as depicted is a house. As those who are skilled in the art will appreciate after reading this specification, however, building 600 can be a different type of structure with a roof and walls, or can instead be a defined area that comprises multiple sub-areas, wherein at least a portion of the area and/or sub-areas is defined by something other than a roof and/or walls.

Figure 7:
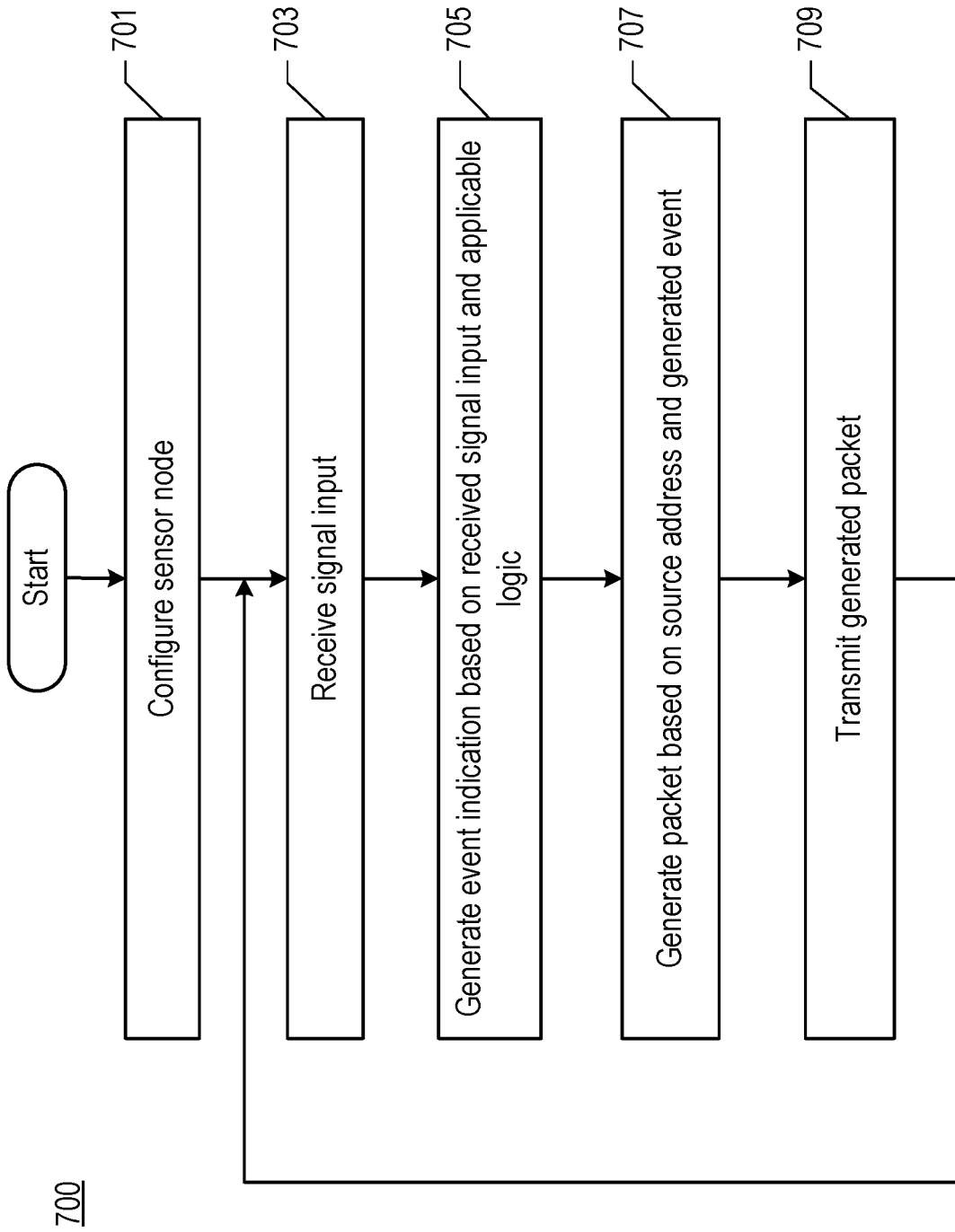
FIG. 7 depicts some salient operations of method 700, by which sensor node 601-5 in building performs various actions.

Operations of Sensor Node 601-*m*: FIG. 7 depicts some salient operations of method 700 according to the illustrative embodiment of the present invention, by which sensor node 601-5, which is featured here for pedagogical purposes, performs various actions.

In regard to method 700, as well as to the other methods depicted in the flowcharts and message flow diagrams contained herein, it will be clear to those having ordinary skill in the art, after reading the present disclosure, how to make and use alternative embodiments of the disclosed methods in which the recited operations, sub-operations, and messages are differently sequenced, grouped, or sub-divided—all within the scope of the present invention. It will be further clear to those skilled in the art, after reading the present disclosure, how to make and use alternative embodiments of the disclosed methods wherein some of the described operations, sub-operations, and messages are optional, are omitted, or are performed by other elements and/or systems.

In accordance with operation 701, sensor node 601-5 is configured as described below and with respect to FIGS. 9A through 9E. Then, the node enters a run-time mode.

In accordance with operation 703, node 601-5 receives a signal of the physical condition being monitored, the condition in the example being a switch being turned on or off.

In accordance with operation 705, node 601-5 generates an event indication based on the received signal (i.e., based on the event occurring). For example, the event indication can be "switch is on" or "switch is off". In some embodiments of the present invention, the event can also be based on applicable logic.

In accordance with operation 707, node 601-1 generates a data packet containing the source address of node 601-5, one or more space addresses (e.g., a first space address, a second space address, etc.) that have been configured, and the event indication. Such a packet comprises a set of data elements, in which the source address, as a data element, is represented by its corresponding data value, each space address, as another data element, is represented by its corresponding data value, and the event indication, as yet another data element, is represented by its corresponding data value. In some embodiments, the generating of the packet itself signifies an indication of an event occurring; in this case, the inclusion of an event indication data element in the packet is optional.

In accordance with operation 709, node 601-5 transmits the generated packet via a computer network (not depicted) similar to computer network 204. In accordance with the illustrative embodiment of the present invention, node 601-5 is unaware of who the packet's recipients are and, accordingly, no identifier (e.g., network address, etc.) of any actor node, and that would uniquely identify that actor node, needs to be present in the generated packet. An important aspect of this is that each actor node will be monitoring not for its own identifier (e.g., network address, etc.) in each transmitted packet, but for subscribed-to space identifiers (e.g., space addresses, etc.) and, in some embodiments, for source identifiers (e.g., source network addresses, etc.) contained in the packets. In some alternative embodiments of the present invention, however, one or more actor identifiers (e.g., destination network addresses, etc.) can be present in one or more of the transmitted packets.

In some embodiments of the present invention, the transmitting sensor node does not expect an acknowledgment packet from the actor node, nor does it expect in general to be addressed by the actor node. Therefore, each transmitting sensor node might transmit the generated packet more than once in some embodiments, in order to improve the likelihood that the packet is detected and acted upon by the actor node.

After operation 709, control of execution returns to operation 703.

Concurrently with sensor node 601-5 operating in accordance with the operations described above, one or more physically distinct sensor nodes (e.g., sensor node 601-6, sensor node 601-7, etc.) in addition to sensor node 601-5 can operate in accordance with the operations described above.

In this way, multiple sensor nodes can be concurrently transmitting packets via the computer network, and without any coordination of one another.

Figure 8:
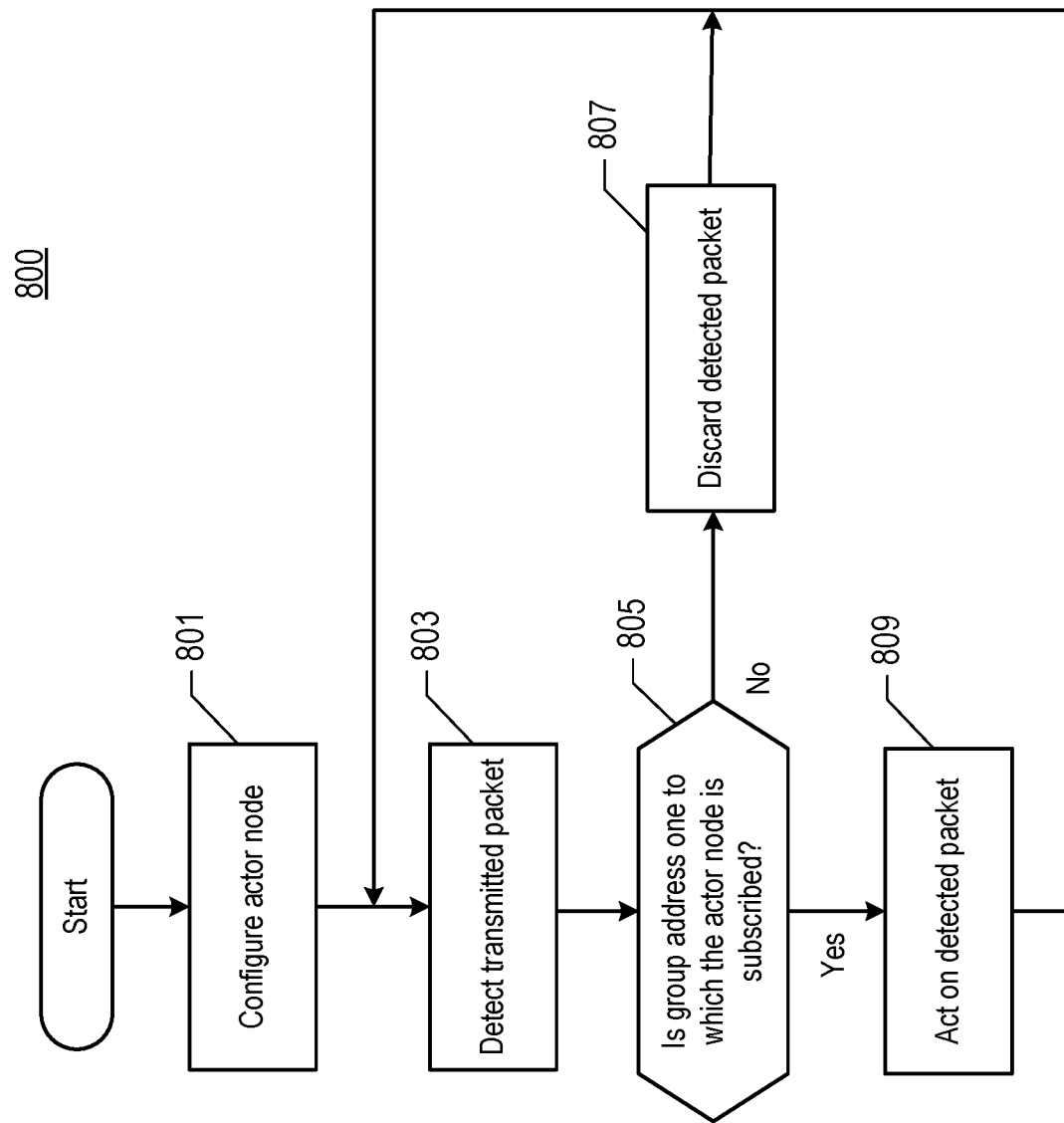
FIG. 8 depicts some salient operations of method 800, by which actor node 602-5 in building 600 performs various actions.

Operations of Actor Node 602-*n*: FIG. 8 depicts some salient operations of method 800 according to the illustrative embodiment of the present invention, by which actor node 602-5, which is featured here for pedagogical purposes, performs various actions. In accordance with operation 801, actor node 602-5 is configured as described below and with respect to FIGS. 9A through 9E. Then, the node enters a run-time mode.

Actor node 602-5 then begins monitoring transmitted packets containing sets of data elements (e.g., tuples, etc.), in the plurality of packets being transmitted by one or more sensor nodes as described with respect to FIG. 7. In accordance with operation 803 and as part of the ongoing monitoring, node 602-5 detects a transmitted packet containing a transmitted set of data elements and, as such, is a recipient of the transmitted packet.

In accordance with operation 805, node 602-5 determines whether a space address contained in the packet, if a space address is present, is one to which node 602-5 is subscribed (i.e., as configured in operation 801). If it is not one to which node 602-5 is subscribed, control of execution proceeds to operation 807. Only if it is one to which node 602-5 is subscribed, control of execution proceeds to operation 809.

In accordance with operation 807, node 602-5 discards the detected packet, taking no further action with the packet. Control of execution then returns to operation 803.

In accordance with operation 809, node 602-5 acts on the detected packet, at least in part by generating a signal (e.g., a control signal to apply a configured control value, etc.). For example, node 602-5 in FIG. 6 generates a control signal to turn on its illumination source whenever, as configured, it receives a packet from sensor node 601-5 or 601-6 that indicates that a switch has been turned on. Other examples of how node 602-5 can act upon the detected packet can be found in U.S. patent application Ser. No. 14/467,407, filed Aug. 25, 2014, which is incorporated by reference herein.

In some embodiments of the present invention, an actor node can be subscribed to a source address and act upon a detected data packet if the packet contains the subscribed-to source address. For example, node 602-4 in FIG. 6 can be monitoring battery levels of one or more sensor nodes themselves, or monitoring a different condition of a sensor node itself (i.e., as opposed to a condition of the environment surrounding the sensor node), including sensor nodes 601-5 through 601-7. Node 602-4 can generate a control signal to update sensor node status (e.g., on a user display, to trigger a user alarm or message, etc.) whenever, as configured, it receives a packet from sensor node 601-5, 601-6, or 601-7 that indicates battery level (e.g., low-battery condition, etc.) for that sensor node corresponding to the received source address.

An actor node can act upon a received packet comprising a source address and/or a space address to which the actor node is subscribed. Additionally, a given actor node can perform a first function in response to receiving a packet comprising a subscribed-to space address and a second function in response to receiving a packet comprising a subscribed-to source address. The packet comprising the space address and the packet comprising the source address can be different or they can be one and the same packet.

Control of execution then returns to operation 803.

Concurrently with actor node 602-5 operating in accordance with the operations described above, one or more physically distinct actor nodes (e.g., actor node 602-7, etc.)

in addition to actor node 602-5 can operate in accordance with the operations described above. Continuing with the example above, in addition to node 602-5 turning its associated light on whenever it receives a packet from sensor node 601-5 or 601-6, actor node 602-7, and other actor nodes, can each turn their lights on in accordance with how they were configured, as described below and with respect to FIGS. 9A through 9E.

Multiple actor nodes can be concurrently monitoring for and detecting packets transmitted via the computer network, from one or more sensor nodes and without any coordination of each other. Notably, multiple actor nodes might act upon a particular packet, based in part on the space address(es) and/or event indication contained in the packet being relevant to more than one actor node and possibly on the space address(es) and/or event indication having been present in previous packets.

Configuring the Sensor Nodes and Actor Nodes: Sensor nodes 601 and actor nodes 602 in general can be configured at configuration time, prior to entering their run-time modes. An installer (e.g., technician, consumer, house occupant, etc.), or other type of user, can use device 603 to configure the sensor and actor nodes throughout building 600 in FIG. 6.

FIGS. 9A through 9E depict various examples of configuring a predetermined collection of sensor nodes and actor nodes within a particular area of building 600—namely, area 900 coinciding with a kitchen area. As part of the example a user wants to configure one or more actor nodes—namely, actor nodes 602-5 and 602-7—to turn on or off its associated illumination source (i.e., "turn itself on or off") whenever one or more sensor nodes—namely, sensor nodes 601-5 through 601-7—sense that their associated switches are being turned on or off. The user specifies this by using an app running on user device 603, in order to subscribe the actor nodes to one or more space addresses and to configure the sensor nodes to transmit packets comprising one or more of the space addresses, wherein each space address is representative of a predetermined space within building 600.

In the various examples, the user can configure node actor 602-5 to turn its light on whenever it receives a "switch on" packet from sensor node 601-5, or from node 601-5 or 601-6, depending on the example. The user can also configure actor node 602-7 to turn its light on whenever it receives a "switch on" packet from sensor node 601-7, or from node 601-6 or 601-7, depending on the example. The user can similarly configure other actor nodes, outside or within area 900, to react, such that a given actor node turns on its illumination source based on detecting a packet with a space address to which the actor node is subscribed.

In accordance with the illustrative embodiment, user device 603 displays a diagram similar to at least a portion of that depicted in FIG. 6 and FIGS. 9A through 9E, as part of a graphical user interface (GUI) of the app being executed by the device. The GUI enables the user to define spaces by drawing space-defining boundaries on the diagram. For example, GUI enables the user to draw, or otherwise identify, areas 911, 912, and 912 on the diagram, as explained below, corresponding to a "kitchen" space, a "kitchen counter" space, and a "dining" space, respectively. User device 603 then generates a space address that is representative of a delineated space on the GUI, for each space identified on the diagram by the user.

Generally speaking, user device 603 is capable of receiving commands being inputted into the GUI or otherwise entered by its user and of translating those commands into configuration information. Consistent with the examples depicted in FIGS. 9A through 9E and described below, user device 603 translates the user's commands into messages that are sent to the actor nodes, in which the space addresses representative of predetermined spaces are provided to the specific actor nodes that are to be subscribed to the space addresses.

Figure 9B:
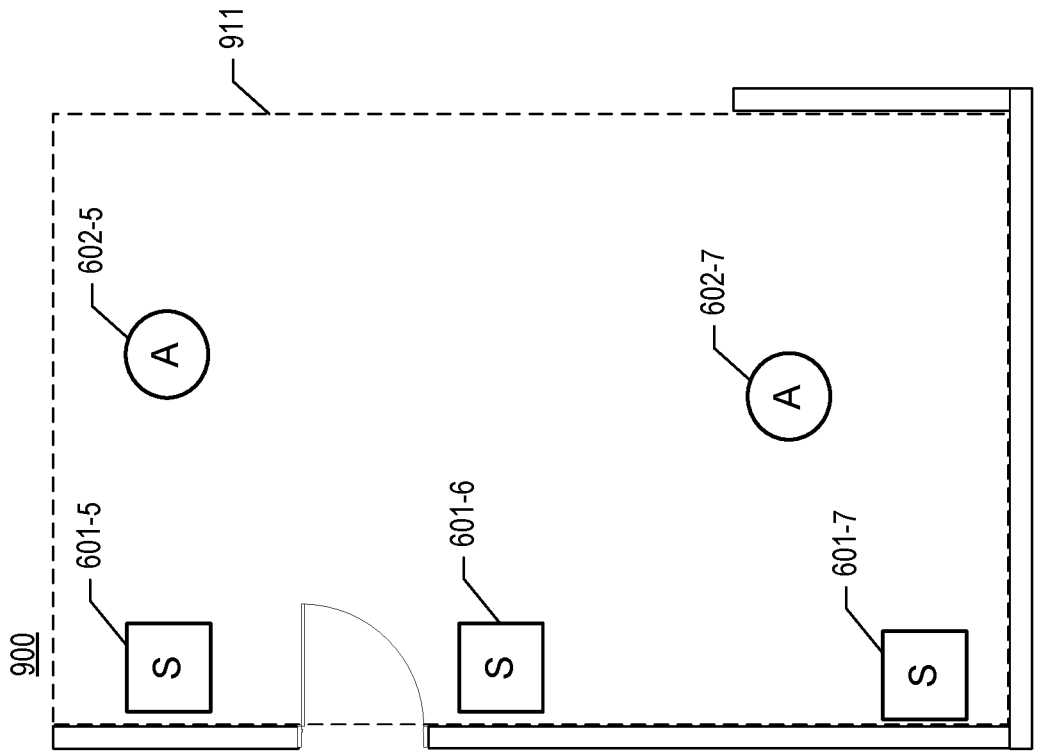
Figure 9A:
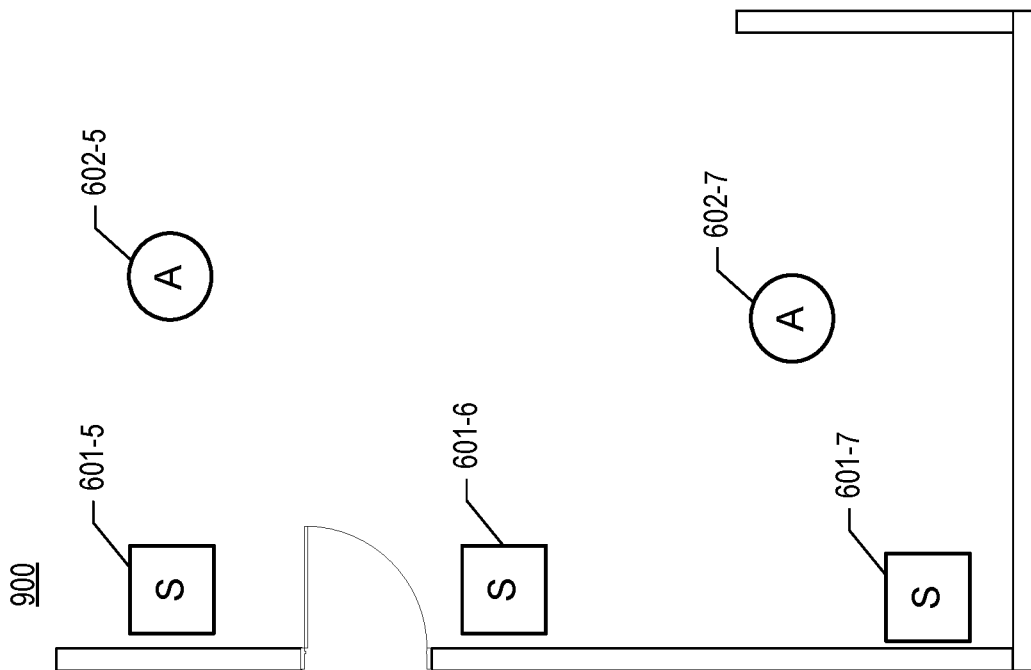

A first example, depicted in FIG. 9A, is now described. In this first example, there are the three sensor nodes and the two actor nodes introduced earlier. In some embodiments of the present invention, all of the nodes have been preconfigured by a party other than the user (e.g., at the factory, etc.) to transmit, in the case of the sensor nodes, and be subscribed to, in the case of the actor nodes, a default space address (i.e., "ZZ"). Conceptually, the default space address can be representative of a space that is equivalent to the controllable universe, or to an area that is at least as large as that of an area to be subdivided, such as building 600.

The overall effect of having all sensor nodes and actor nodes within area 900 is that both actor nodes 602-5 and 602-7 are configured to act upon any event indications being transmitted by sensor nodes 601-5 through 601-7. In other words, actor 602-5 turns its light on, or off, whenever a switch at sensor node 601-5, 601-6, or 601-7 is turned on, or off, respectively. Similarly, actor 602-7 turns its light on, or off, whenever a switch at sensor node 601-5, 601-6, or 601-7 is turned on, or off, respectively.

A second example, depicted in FIG. 9B, is now described. This example is similar to that depicted in FIG. 9A, except that the user configures the nodes to transmit, in the case of the sensor nodes, and be subscribed to, in the case of the actor nodes, a space address (i.e., "L1") that is representative of a space coinciding with the kitchen of building 600 (i.e., space="kitchen").

A primary difference between the examples in FIGS. 9A and 9B is that in FIG. 9B the user, through user device 603, configures the depicted sensor and actor nodes via the GUI of the app executing on the device. As can be seen in message flow 1000 in FIG. 10, user interface 501, on which the GUI is being displayed, transmits message 1001 to processor 503, in response to inputs from the user creating "kitchen" space 911. In response to message 1001, which can be one or more signals, processor 503 generates space address L1 at task 1003.

In response to task 1003, device 603 transmits configuration messages 1005, 1007, 1009, 1011, and 1013 to nodes 601-5, 602-5, 601-6, 601-7, and 602-7, respectively, by addressing each node in the corresponding message. This results in the configuring of the affected sensor nodes to transmit space address L1 and subscribing the affected actor nodes to act upon packets that contain space address L1. These messages also remove any default address ZZ from the sensor and actor nodes.

A third example, depicted in FIG. 9C, is now described. In this example, the user desires that the switch at sensor node 601-7 control only the lamp at actor node 602-7, which is above a dining table, and that the switch at sensor node 601-5 control only the lamp at actor node 602-5, which is near a kitchen counter. In this example, the user has not previously created a "kitchen" space such as the space created in FIG. 9B.

Figure 11:
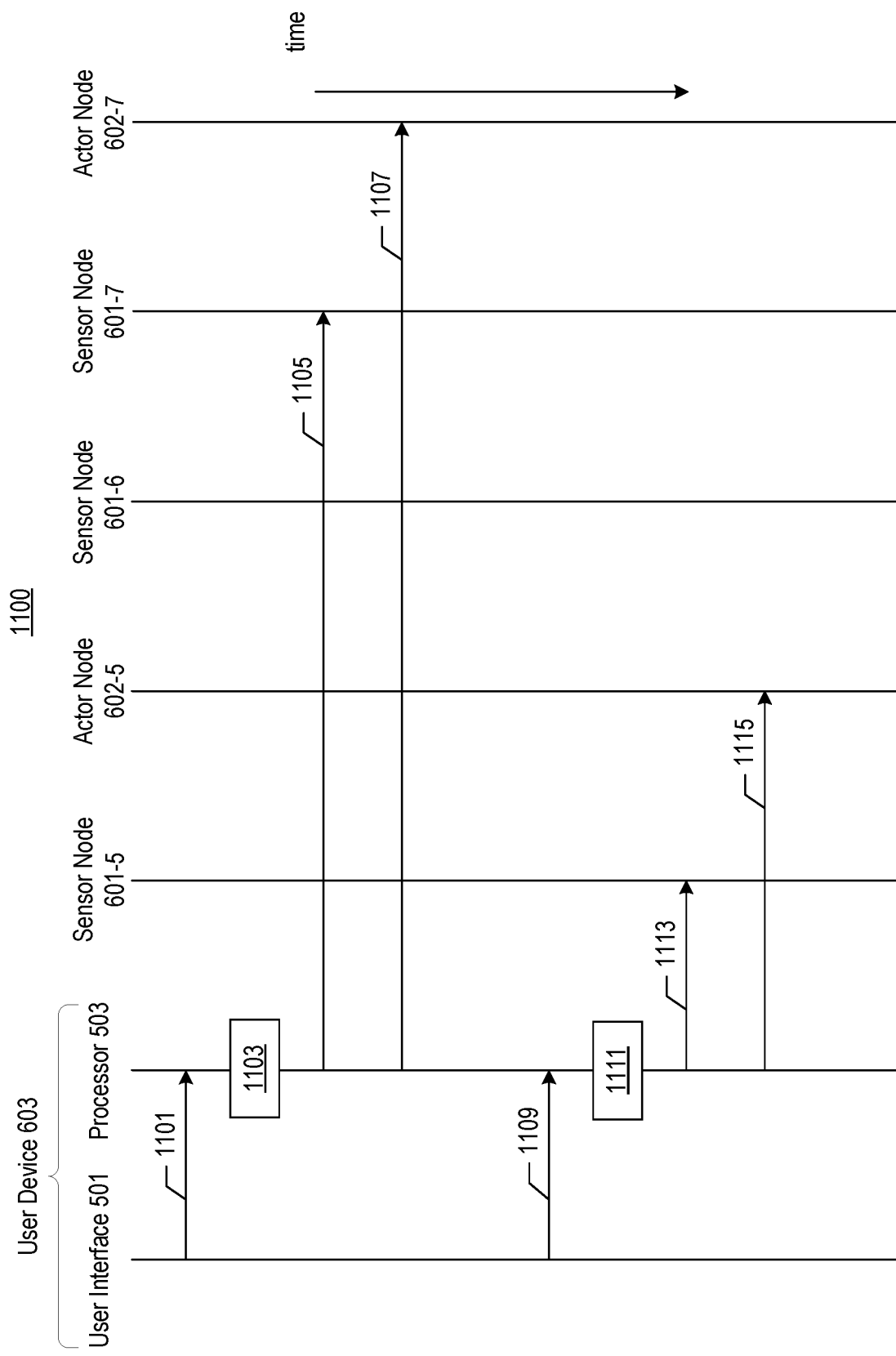
FIG. 11 depicts message flow 1100 corresponding to the configuration depicted in FIG. 9C.

Using the app, the user creates "dining" space 913. In message flow 1100 of FIG. 11, this translates to user interface 501 transmitting message 1101 to processor 503, in response to inputs from the user created "dining" space 913. In response to message 1101, which can be one or more signals, processor 503 generates space address K1 at task 1103.

In response to task 1103, device 603 transmits configuration messages 1105 and 1107 to nodes 601-7 and 602-7, respectively, by addressing each node in the corresponding message. This results in the configuring of the affected sensor node to transmit space address K1 and subscribing the affected actor node to act upon packets that contain space address K1. These messages also remove any default address ZZ from the sensor and actor nodes. The effect of these messages is that when the switch associated with sensor node 601-7 is actuated, only the lamp above the dining table (i.e., in "dining" space) reacts to it, even though both actor node 602-5 and 602-7 are receiving the packets that convey the actuating events from sensor node 601-7.

Additionally, the user creates "counter" space 912. In message flow 1100, this translates to user interface 501 transmitting message 1109 to processor 503, in response to inputs from the user created "counter" space 912. In response to message 1109, which can be one or more signals, processor 503 generates space address K2 at task 1111.

In response to task 1111, device 603 transmits configuration messages 1113 and 1115 to nodes 601-5 and 602-5, respectively, by addressing each node in the corresponding message. This results in the configuring of the affected sensor node to transmit space address K2 and subscribing the affected actor node to act upon packets that contain space address K2. These messages also remove any default address ZZ from the sensor and actor nodes. The effect of these messages is that when the switch associated with sensor node 601-5 is actuated, only the lamp near the kitchen counter (i.e., in "counter" space) reacts to it, even though both actor node 602-5 and 602-7 are receiving the packets that convey the actuating events from sensor node 601-5.

A fourth example, depicted in FIG. 9D, is now described. In this example, which adds to the example depicted in FIG. 9C, the user also wants to have a master switch to actuate both of the lights in the kitchen (i.e., those at actor nodes 602-5 and 602-7), in addition to the switches controlling the lights individually.

Figure 12:
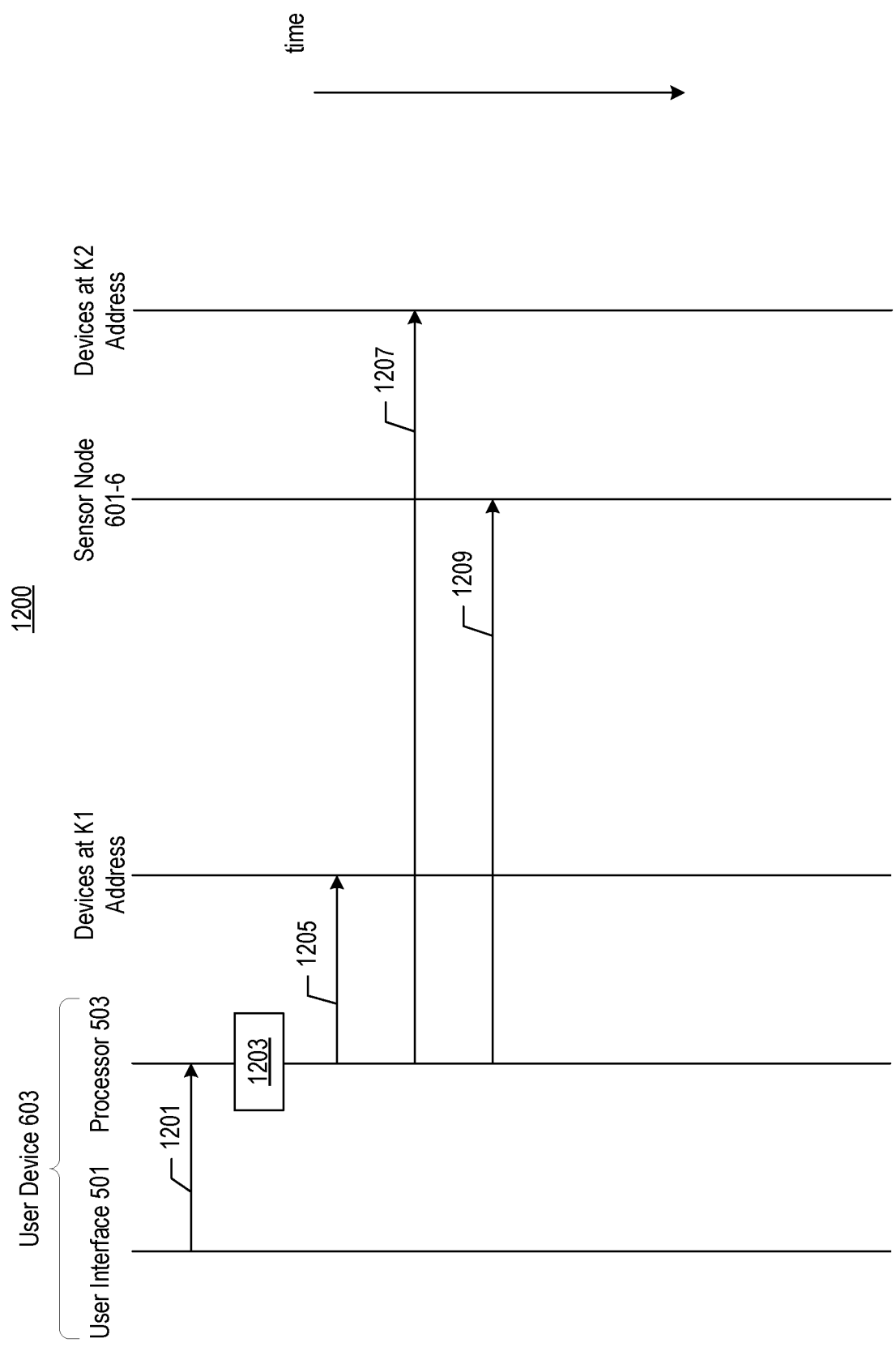
FIG. 12 depicts message flow 1200 corresponding to the configuration depicted in FIG. 9D.

Using the app, the user creates "kitchen" space 914. In message flow 1200 of FIG. 12, this translates to user interface 501 transmitting message 1201 to processor 503, in response to inputs from the user created "kitchen" space 914. In response to message 1201, which can be one or more signals, processor 503 generates space address L1 at task 1203.

In response to task 1203, device 603 transmits configuration messages 1205, 1207, and 1209. These messages also remove any default address ZZ from the sensor and actor nodes, if not already removed. Whereas device 603 addresses sensor node 601-6 in message 1209, device 603 specifies space addresses K1 and K2 in messages 1205 and 1207, respectively, instead of directly addressing the nodes already associated with those space addresses (i.e., sensor nodes 601-5 and 601-7 and actor nodes 602-5 and 602-7).

In some embodiments of the present invention, device 603 uses space addresses for addressing purposes whenever the device has already provided the one or more nodes that are being configured with the space addresses that the nodes are to use. For instance, in the current example the user essentially moved, or reassigned, counter space 912 and dining space 913 into kitchen space 914 on the GUI. Because kitchen space 914 encompasses spaces 912 and 913, device 603 may configure the affected nodes to recognize space address L1, by transmitting configuration messages that address space addresses K1 and K2. This is significant in that at least some of the nodes that are being configured do not have to be addressed by their own network addresses, which would involve possibly multiple messages directed at multiple nodes, and can instead be communicated with via the space addresses to which the nodes are already subscribed, possibly reducing the number of messages transmitted.

This results in the configuring of sensor node 601-6 to transmit space address L1 and subscribing affected actor nodes 602-5 and 602-7 to act upon packets that contain space address L1, in addition to actor node 602-5 acting upon space address K2 and actor node 602-7 acting upon space address K1. The effect of these messages is that when the switch associated with sensor node 601-6 is actuated, both the lamp above the dining table (i.e., in "dining" space) and the lamp near the kitchen counter (i.e., in "counter" space) act upon it.

Figure 9E:
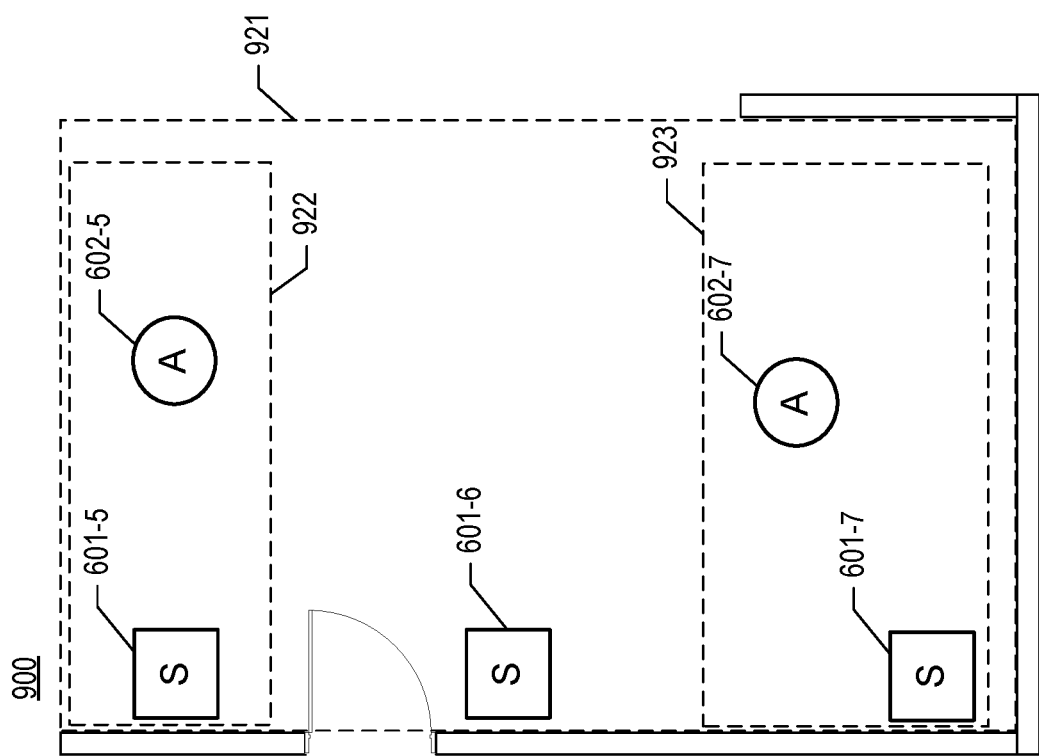

A fifth example, depicted in FIG. 9E, is now described. In this example, wants to first create kitchen space 921 and then create sub-spaces—namely, counter space 922 and dining space 923. Although the net effect of this might appear similar to what is achieved in FIG. 9D, some of the operations performed are different due to the different sequence of space creation.

Figure 13:
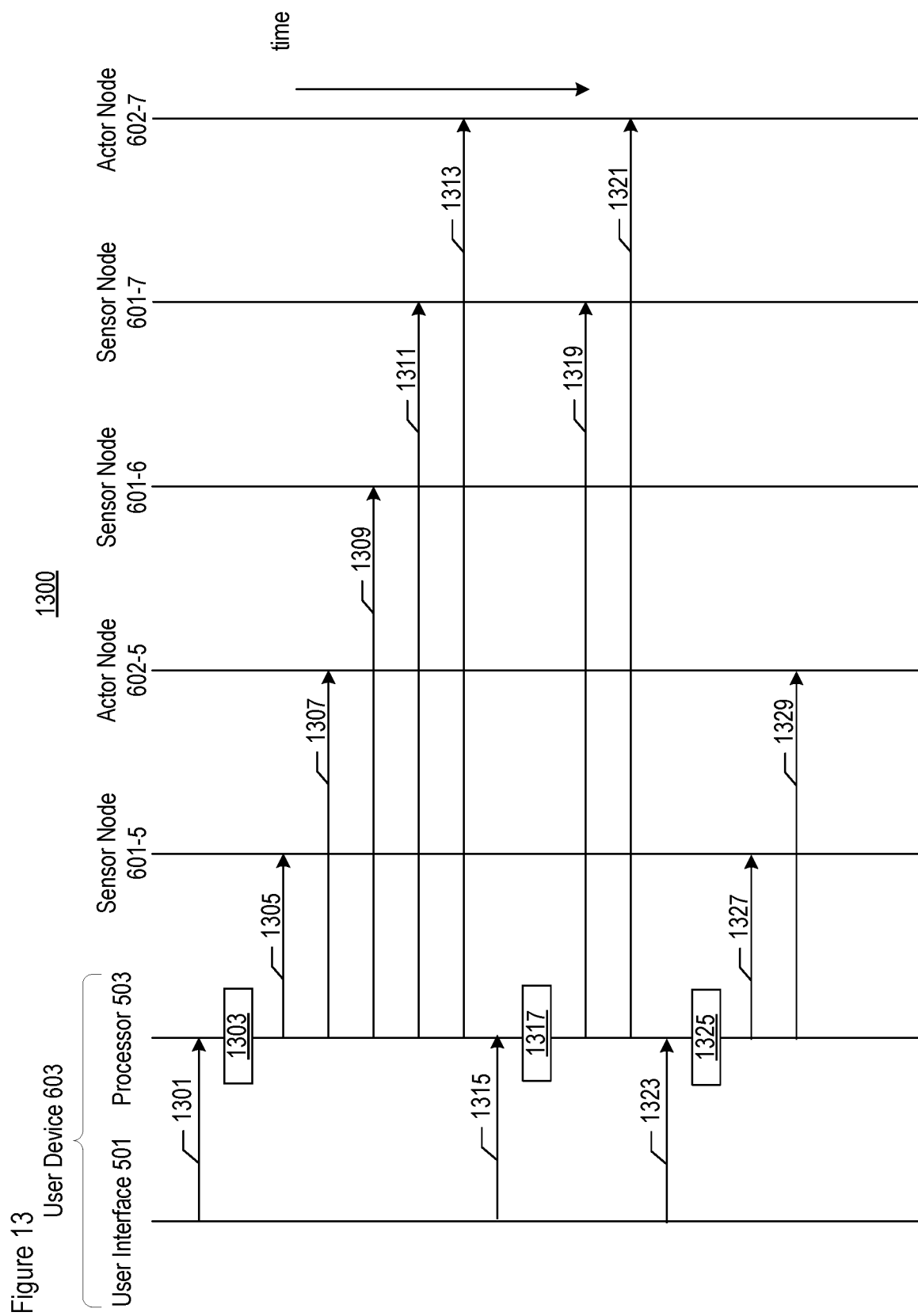
FIG. 13 depicts message flow 1300 corresponding to the configuration depicted in FIG. 9E.

Using the app, the user creates "kitchen" space 921. In message flow 1300 of FIG. 13, this translates to user interface 501 transmitting message 1301 to processor 503, in response to inputs from the user created "kitchen" space 921. In response to message 1301, which can be one or more signals, processor 503 generates space address L1 at task 1303.

In response to task 1303, device 603 transmits configuration messages 1305, 1307, 1309, 1311, and 1313 to nodes 601-5, 602-5, 601-6, 601-7, and 602-7, respectively, by addressing each node in the corresponding message. This results in the configuring of the affected sensor nodes to transmit space address L1 and subscribing the affected actor nodes to act upon packets that contain space address L1. These messages also remove any default address ZZ from the sensor and actor nodes.

The user then creates "dining" space 923. In message flow 1300, this translates to user interface 501 transmitting message 1315 to processor 503, in response to inputs from the user created "dining" space 923. In response to message 1315, which can be one or more signals, processor 503 generates space address K1 at task 1317.

In response to task 1317, device 603 transmits configuration messages 1319 and 1321 to nodes 601-7 and 602-7, respectively, by addressing each node in the corresponding message. This results in the configuring of the affected sensor node to transmit space address K1 and subscribing the affected actor node to act upon packets that contain space address K1. The effect of these messages is that when the switch associated with sensor node 601-7 is actuated, only the lamp above the dining table (i.e., in "dining" space) reacts to it, even though both actor node 602-5 and 602-7 are receiving the packets that convey the actuating events from sensor node 601-7. At this point, nodes 601-7 and 602-7 are subscribed to space addresses L1 and K1.

Additionally, the user creates "counter" space 922. In message flow 1300, this translates to user interface 501 transmitting message 1323 to processor 503, in response to inputs from the user created "counter" space 922. In response to message 1323, which can be one or more signals, processor 503 generates space address K2 at task 1325.

In response to task 1325, device 603 transmits configuration messages 1327 and 1329 to nodes 601-5 and 602-5, respectively, by addressing each node in the corresponding message. This results in the configuring of the affected sensor node to transmit space address K2 and subscribing the affected actor node to act upon packets that contain space address K2. The effect of these messages is that when the switch associated with sensor node 601-5 is actuated, only the lamp near the kitchen counter (i.e., in "counter" space) reacts to it, even though both actor node 602-5 and 602-7 are receiving the packets that convey the actuating events from sensor node 601-5. At this point, nodes 601-5 and 602-5 are subscribed to space addresses L1 and K2.

Figure 14:
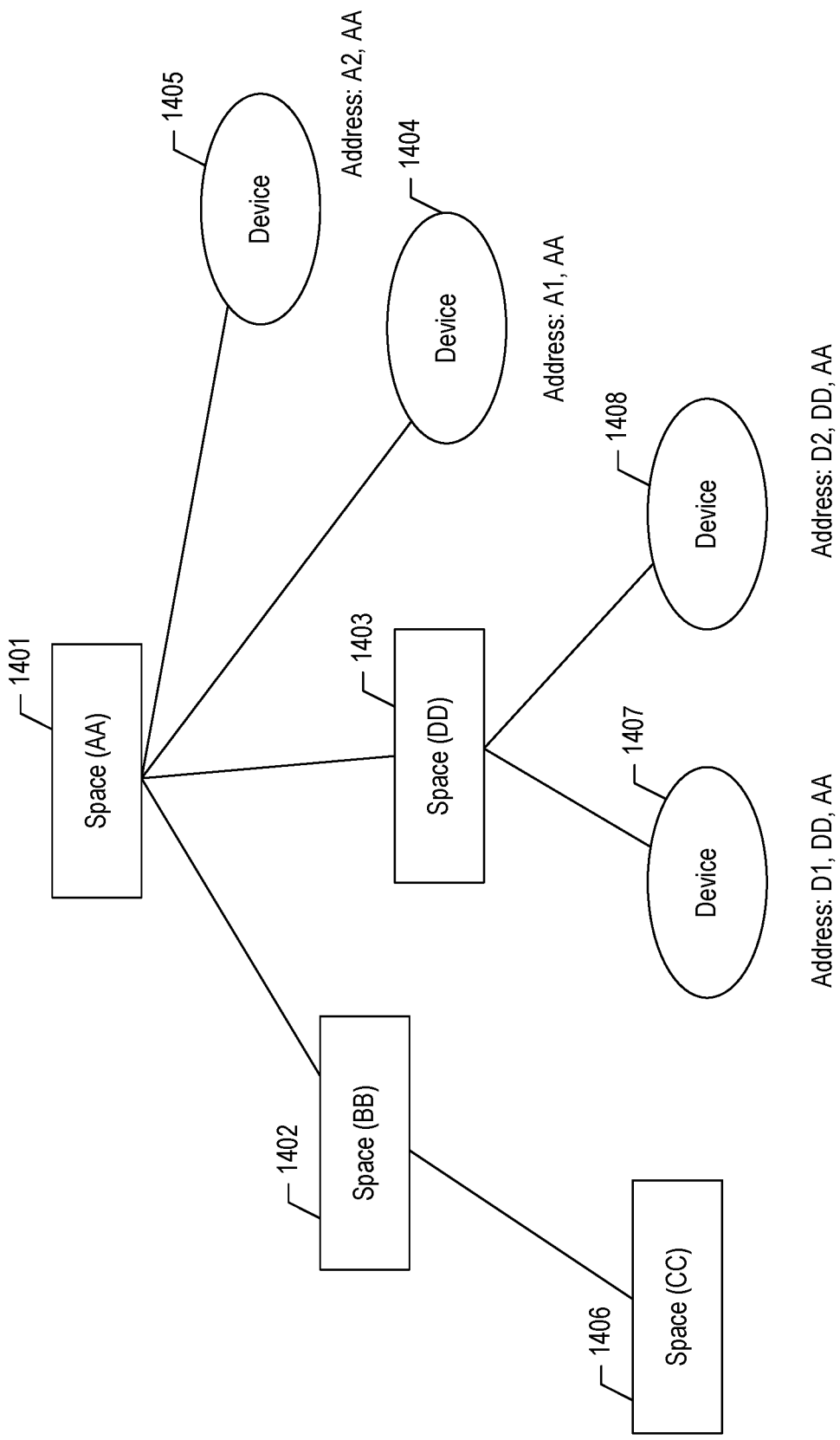
FIG. 14 depicts an alternative user interface of user device 603, featuring a hierarchical presentation of how spaces and devices are related to each other.

In accordance with the illustrative embodiment, and as already discussed, user device 603 displays a diagram similar to at least a portion of that depicted in FIG. 6 and FIGS. 9A through 9E, as part of a graphical user interface (GUI) of the app being executed by the device. In some embodiments of the present invention, user device 603 features a different type of user interface. For example, and without limitation, the user interface of user device 603 features a hierarchical presentation to the user of how the spaces and devices are related to each other, as depicted in FIG. 14.

As depicted in the figure, the user has arranged space 1401, which is represented by space address AA, to contain spaces 1402 and 1403, which are represented by space addresses BB and DD, respectively, and devices 1404 and 1405. Consequently, in addition to having their own device addresses A1 and A2, respective devices 1404 and 1405 are subscribed to space address AA. The user has also arranged space 1402, which is represented by space address BB, to contain space 1406, which is represented by space address CC. The user has also arranged space 1403, which is represented by space address DD, to contain devices 1407 and 1408. Consequently, in addition to having their own device addresses D1 and D2, respective devices 1407 and 1408 are subscribed to space addresses AA (i.e., of space 1401) and DD (i.e., of space 1403).

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for automation and control within a building, comprising:
    transmitting, by a configuring device through a wireless network, a first message for subscribing a first network node to a first space address, the first network node comprising a first illumination source providing lighting, wherein the first space address is representative of a first predetermined space within the building;
    receiving, by the first network node, packets transmitted in the wireless network; and
    adjusting, by the first network node, the lighting provided by the first illumination source in response to receiving a first data packet in the packets that are transmitted in the wireless network, only if the first space address is both (a) received in the first data packet and (b) subscribed to by the first network node.

2. The method of claim 1, further comprising:
    transmitting, by the configuring device through the wireless network, a second message for subscribing a second network node to the first space address, the second network node comprising a second illumination source providing lighting;
    receiving, by the second network node, the packets transmitted in the wireless network; and
    adjusting, by the second network node, the lighting provided by the second illumination source in response to receiving the first data packet in the packets that are transmitted in the wireless network, only if the first space address is both (a) received in the first data packet and (b) subscribed to by the second network node.

3. The method of claim 2, wherein the first data packet is relayed by at least one of the first network node and the second network node according to a mesh network.

4. The method of claim 2, further comprising:
    transmitting, by the configuring device through the wireless network, a third message for configuring a third network node to publish information to the first space address;
    sensing a first set of information about an environment, by the third network node;
    generating, by the third network node, the first packet based on the sensing of the first set of information; and
    transmitting, by the third network node through the wireless network, the first packet, wherein the first packet comprises (a) a first data value based on the first set of information sensed about the environment and (b) the first space address.

5. The method of claim 4, wherein the first set of information sensed is one of (a) ambient light and (b) occupancy.

6. The method of claim 4, further comprising:
    transmitting, by the configuring device through the wireless network, a fourth message for subscribing the first network node to a second space address, wherein the second space address is representative of a second predetermined space within the building; and
    adjusting, by the first network node, the lighting provided by the first illumination source in response to receiving a second data packet in the packets that are transmitted in the wireless network, only if the second space address is both (a) received in the second data packet and (b) subscribed to by the first network node.

7. The method of claim 6, wherein the first predetermined space and second predetermined space overlap in area.

8. The method of claim 7, wherein the second predetermined space is a smaller subset of the first predetermined space.

9. The method of claim 6, further comprising:
    transmitting, by the configuring device through the wireless network, a fifth message for configuring a fourth network node to publish information to the second space address;
    sensing a second set of information about an environment, by the fourth network node;
    generating, by the fourth network node, the second packet based on the sensing of the second set of information; and
    transmitting, by the fourth network node through the wireless network, the second packet, wherein the second packet comprises (a) a second data value based on the second set of information sensed about the environment and (b) the second space address.

10. The method of claim 1, further comprising:
    receiving, by the configuring device, inputs by a user to define the first predetermined space; and
    generating, by the configuring device, the first message for subscribing the first network node to the first space address, based on the inputs by the user to define the first predetermined space.

11. The method of claim 1, wherein the first message is formatted to address the first network node by a network address of the first network node, wherein the network address of the first network node uniquely identifies the first network node within the wireless network, and wherein the network address of the first network node is absent from the first data packet.

12. A method for automation and control within a building, comprising:
   transmitting, by a configuring device through a wireless network, a first set of messages for subscribing a first network node to a first space address and to a second space address, the first network node comprising a first illumination source providing lighting, wherein the first space address is representative of a first predetermined space within the building, and wherein the second space address is representative of a second predetermined space within the building;
   receiving, by the first network node, packets transmitted in the wireless network;
   adjusting, by the first network node, the lighting provided by the first illumination source in response to receiving a first data packet in the packets that are transmitted in the wireless network, only if the first space address is both (a) received in the first data packet and (b) subscribed to by the first network node; and
   adjusting, by the first network node, the lighting provided by the first illumination source in response to receiving a second data packet in the packets that are transmitted in the wireless network, only if the second space address is both (a) received in the second data packet and (b) subscribed to by the first network node.

13. The method of claim 12, wherein the first predetermined space and second predetermined space overlap in area.

14. The method of claim 13, wherein the second predetermined space is a smaller subset of the first predetermined space.

15. The method of claim 12, further comprising:
   receiving, by the configuring device, inputs by a user to define the first predetermined space and the second predetermined space; and
   generating, by the configuring device, the first set of messages for subscribing the first network node to the first space address and the second space address, based on the inputs by the user to define the first predetermined space and the second predetermined space;
   wherein the first set of messages are formatted to address the first network node by a network address of the first network node, wherein the network address of the first network node uniquely identifies the first network node within the wireless network, and wherein the network address of the first network node is absent from the first data packet and from the second data packet.

16. A method for automation and control within a building, comprising:
   receiving, by a configuring device, inputs by a user to define a first predetermined space within the building;
   generating, by the configuring device, a first message for subscribing a first network node to a first space address that is representative of the first predetermined space, based on the inputs by the user to define the first predetermined space, wherein the first network node comprises a first illumination source providing lighting, and wherein the first message is formatted to address the first network node by a network address of the first network node, wherein the network address of the first network node uniquely identifies the first network node within the wireless network;
   transmitting, by the configuring device, the first message through a wireless network;
   receiving, by the first network node, packets transmitted in the wireless network; and
   adjusting, by the first network node, the lighting provided by the first illumination source in response to receiving a first data packet in the packets that are transmitted in the wireless network, only if the first space address is both (a) received in the first data packet and (b) subscribed to by the first network node.

17. The method of claim 16, wherein the network address of the first network node is absent from the first data packet.

18. The method of claim 16, further comprising:
   transmitting, by the configuring device through the wireless network, a second message for subscribing the first network node to a second space address, wherein the second space address is representative of a second predetermined space within the building; and
   adjusting, by the first network node, the lighting provided by the first illumination source in response to receiving a second data packet in the packets that are transmitted in the wireless network, only if the second space address is both (a) received in the second data packet and (b) subscribed to by the first network node.

19. The method of claim 18, wherein the first predetermined space and second predetermined space overlap in area.

20. The method of claim 19, wherein the second predetermined space is a smaller subset of the first predetermined space.

* * * * *